(12) United States Patent
Labian

(10) Patent No.: US 10,896,240 B2
(45) Date of Patent: Jan. 19, 2021

(54) DATA ANALYTICS VIA A VIRTUAL INDEX SERVER

(71) Applicant: Fast Technologies, Inc., San Francisco, CA (US)

(72) Inventor: Derek B. Labian, The Woodlands, TX (US)

(73) Assignee: FAST TECHNOLOGIES, INC., San Francisco, CA (US)

(*) Notice: Subject to any disclaimer, the term of this patent is extended or adjusted under 35 U.S.C. 154(b) by 344 days.

(21) Appl. No.: 15/925,659

(22) Filed: Mar. 19, 2018

(65) Prior Publication Data

US 2019/0286755 A1 Sep. 19, 2019

(51) Int. Cl.
*G06F 17/00* (2019.01)
*G06F 16/958* (2019.01)

(52) U.S. Cl.
CPC .................. *G06F 16/986* (2019.01)

(58) Field of Classification Search
CPC ..... G06F 16/986; G06F 16/256; G06F 16/258
See application file for complete search history.

(56) References Cited

U.S. PATENT DOCUMENTS

| | | | |
|---|---|---|---|
| 6,925,476 B1 * | 8/2005 | Multer | H04L 29/06 |
| 7,188,094 B2 | 3/2007 | Excoffier et al. | |
| 8,782,755 B2 | 7/2014 | Harris et al. | |
| 10,114,882 B2 | 10/2018 | Lipstone | |
| 2014/0173061 A1 | 6/2014 | Lipstone et al. | |
| 2014/0359092 A1 * | 12/2014 | Middleton | G06F 9/541 709/221 |
| 2016/0359988 A1 | 12/2016 | Kazerani et al. | |

FOREIGN PATENT DOCUMENTS

CN 102132255 B 4/2015

OTHER PUBLICATIONS

Zype.com. "Obtaining and Using Real-time, Normalized Raw Data". 2019. (Year: 2019).*

* cited by examiner

*Primary Examiner* — Syed H Hasan
(74) *Attorney, Agent, or Firm* — Kowert, Hood, Munyon, Rankin & Goetzel, P.C.

(57) ABSTRACT

Computer systems and methods for constructing and using a virtual index server. The index of the virtual index server may specify locations of respective portions of data at a plurality of remote storage providers. The index may graft multiple files and folders from multiple storage providers together into a single hierarchical index tree. The virtual index server may be automatically updated to reflect changes in data content at the plurality of remote storage providers. The computer system may automatically retrieve log files from a content delivery network (CDN), normalize the log files according to a first analytics provider, and automatically provide the normalized log files to the first analytics provider.

17 Claims, 20 Drawing Sheets

DATA ANALYTICS VIA A VIRTUAL INDEX SERVER

FIELD

The present disclosure relates to distribution and organization of data files and metadata through a network.

DESCRIPTION OF THE RELATED ART

Cloud and/or remote data storage services are being increasingly used in a wide range of user applications. In many cases, a user may employ the services of several data storage and collaboration services, and organizing, accessing, and modifying data from multiple storage providers may be a cumbersome, error prone, and time-intensive process. Accordingly, improvements in this domain may be desirable.

SUMMARY

This document describes, inter alia, methods for constructing and using a virtual index server, and computer systems configured to implement the described methods.

In some embodiments, a computer system may receive user input specifying at least first and second storage providers, locations of respective portions of data stored on each storage provider, and respective locations in an index for each respective portion. The computer system may construct an aggregate index of data content, the virtual index server, whereby the index refers to the portion of data stored by the first storage provider at a first location, and the index refers to the portion of data stored by the second storage provider at a second location.

In some embodiments, the computer system may receive a request from a second computer system to access the first, second, or both locations of the index. In response, the computer system may retrieve the respective portion of data associated with the requested location, and may provide the respective portion of data to the second computer system.

In some embodiments, the computer system may determine that a subset of the data stored at the first storage provider has been modified and may automatically update the index based on the modification. The computer system may automatically cause a content delivery network (CDN) to pre-cache, revalidate, or flush the modified subset of data, or other cached requests that may utilize the data.

In some embodiments, the computer system may automatically retrieve a first plurality of log files regarding access of data of a first website from the content delivery network (CDN). The computer system may determine that a first analytics provider is associated with the first website and may automatically normalize the first plurality of log files to be compatible with the first analytics provider to produce a first plurality of normalized log entries. The computer system may then automatically provide the first plurality of normalized log entries to the first analytics provider.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
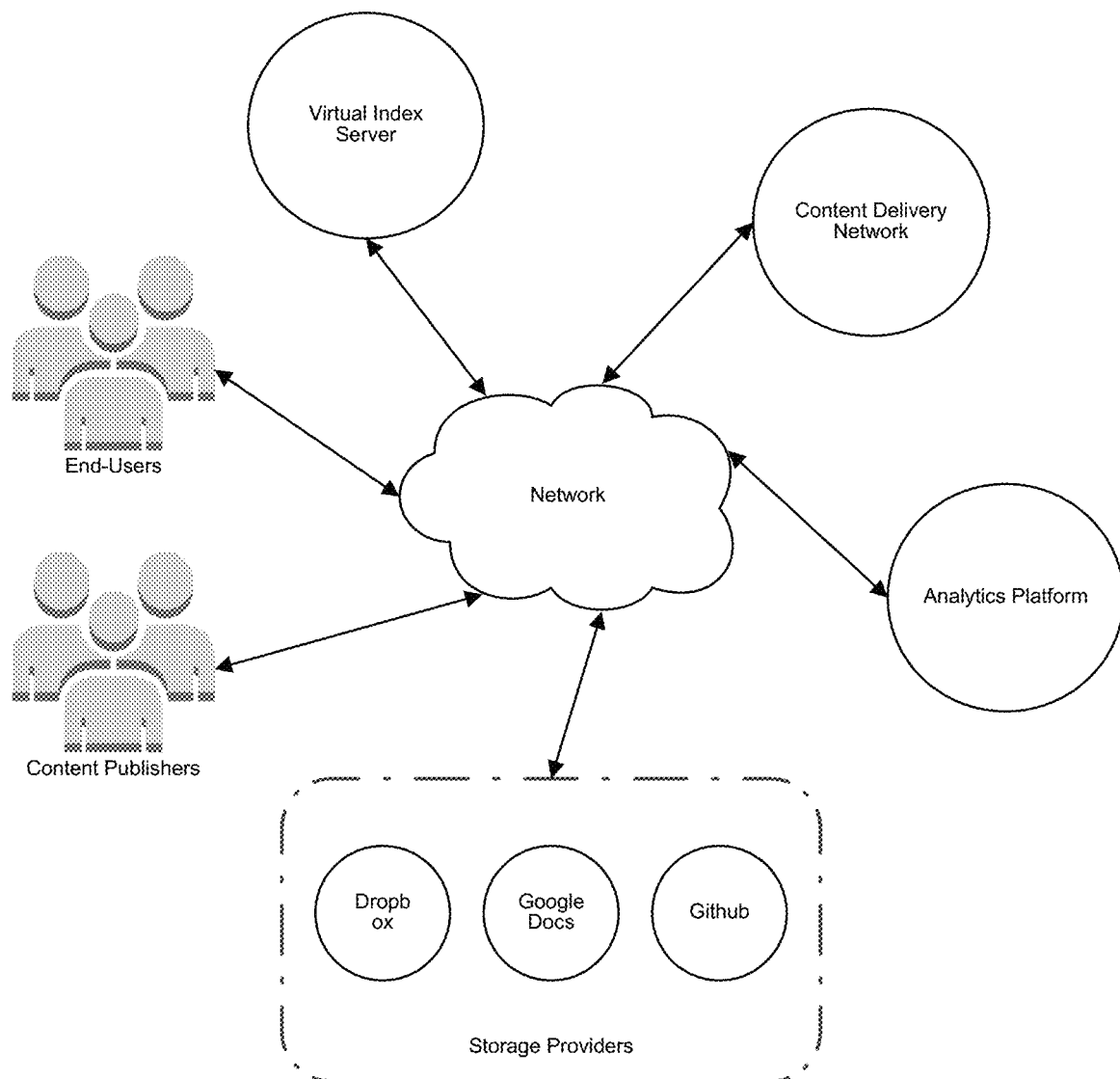
FIG. 1 illustrates an exemplary (and simplified) network communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or it may be located in a second different computer system which connects to the first computer system over a network, such as the Internet, the Internet Small Computer Systems Interface (iSCSI), and/or a storage area network (SAN). In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system may update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but may not be involved in the actual filling of the form (e.g., the user may not manually specify answers to fields but rather they may be automatically completed). The present specification provides various examples of operations being automatically performed in response to actions the user has taken.

Virtual Index Server

In some embodiments, a virtual index server (alternatively and equivalently referred to herein as a "virtual server") is constructed. The descriptor "virtual" in "virtual index server" refers to the virtualization of a HTTP Server's contents, where the contents are composed of a conglomeration of datasets from one or more permissioned storage providers into what appears to be a normal HTTP server to requestors. The HTTP Server's contents are more commonly referred to herein as a "virtual index", which may include a folder hierarchy of the data stored and made accessible as files via the HTTP Server. However, while the virtual index server may be implemented on a HTTP server, it is not a traditional HTTP server, in that it may not contain a data storage structure corresponding to the virtual index, may not store data content referenced by the virtual index, may contain partial data only, may store data in a format abstract to the virtual index itself, and/or may be dynamically constructed and populated, fully or partially, as needed. For example, data content that may be read from a memory medium in a traditional HTTP server, may instead be read from a virtual index server, which may act like a virtual disk or virtual memory medium constructed as needed from the attached/peered storage providers. In other words, the data content of the virtual index server may be constructed virtually based on user specifications and storage provider contents, rather than statically located on a local memory medium.

As one example, a user may use a cloud photo storage application (e.g., Google Photos™ or another photo storage app) for photo storage and a cloud file storage service (e.g., Dropbox™ or another service) for document storage. In this embodiment, a common virtual index server may be constructed to organize and access the stored photos and the stored documents. For example, the photos from Google may appear at http://domain/photos/ and the documents from Dropbox may appear at http://domain/docs/, on the same virtual server. Thus, a computer server may implement the virtual index server by creating an index that may refer to data of one or multiple different storage providers, e.g., without being required to store that data itself. Advantageously, it may not be necessary to duplicate any actual data content to utilize a virtual index server. The virtual index server may facilitate the creation and maintenance of complex file organization and access from multiple, potentially overlapping, sources, without many of the difficulties associated with traditional methods of moving, exporting, and maintaining data content aggregated from multiple locations.

FIG. 1—System for a Dynamic Virtualized HTTP Origin

FIG. 1 illustrates an exemplary (and simplified) network communication system, according to some embodiments. It is noted that the system of FIG. 1 is merely one example of a possible system, and embodiments may be implemented in any of various systems, as desired. Additionally, each component of FIG. 1 may be optionally removed, according to various embodiments.

As illustrated, FIG. 1 includes a network, which may be any network of computer systems which includes network enabled devices on a public network (The Internet), private network (an Intranet), or a combination of public and private networks.

"End users" may be HTTP clients making a valid HTTP request to a content delivery network (CDN) or in some instances to the virtual index server directly. HTTP clients may include web browsers, email clients, embedded devices, or any system that supports HTTP 1.0 or higher. Requests may also be made by derivatives of the HTTP specification, such as secure HTTP (HTTPS), or technologies encapsulating HTTP such as HTTP over TLS.

"Content publishers" or "publishers" may be users or companies who have accounts on the platforms and services ("storage providers" or "providers" discussed below) and wish to make the content available to the end users through the network.

A content delivery network (CDN), sometimes referred to as a "content distribution network", is a network of computers geographically placed around the world to reduce latency and increase throughput of content delivery. These systems cache data content close to the user and read data content from a pre-defined HTTP origin. According to various embodiments, the content delivery network may be part of 1) the same platform as the virtual server, 2) one or more separate content delivery platforms, or 3) both.

Platforms and services ("storage providers" or "providers" or "storage platforms") may be OAuth protected resources which contain data content which may be rendered into HTTP objects, such as files and folders. Storage providers without folders may have a variety of metadata which can be normalized into folders, including groups, repositories, branches, categories, or tags. Storage providers without files may have a variety of static or dynamic data content that can be rendered into files, such as documents, images, video, binary files, archives, text, or user generated content such as postings. Storage providers may also include source code or bytecode which may be dynamically interpreted and rendered at the time of request from an end-user. Providers may be accessible via a public internet, through microservices on a private intranet (e.g., if the virtual index server and the CDN are located on the same private intranet), a virtual private network (VPN) (e.g., a VPN may be a tunnel over another network directly to the storage provider), a dedicated network (e.g., a dedicated network may be a private network connection directly to the storage provider, thus bypassing the Internet), or any combination thereof.

As understood throughout this disclosure, "data content" may be understood to refer to any of various types of data including folders, subfolders, files, or other types of data or segments of data, and may be variously referred to as "data content", "data", "portions of data", and/or "content".

The analytics platform (equivalently referred to as an "analytics provider") may be platforms and services which content publishers use to track usage and/or activity of end-users. The structure and function of the analytics provider are discussed in greater detail below.

The dynamic virtual HTTP origin (a "virtual HTTP server", or a "virtual HTTP origin"), is a HTTP web server which contents are composed of, at least partially, the virtual index server. The virtual HTTP origin may be used as a CDN origin or to make data content available to end users. Responses to requests may be sourced from storage providers, or cached, rendered, and returned as if they were locally stored. Responses may also be dynamically preprocessed before returning the result. Responses may also be constructed dynamically based on the contents of the virtual index server, such as an HTML representation of the index. As discussed in more detail below, activity and usage from end-user requests may be replayed to analytics providers selected by the content publishers either from requests directly made to the virtual HTTP origin or by deconstructing logs of a CDN.

Figure 2:
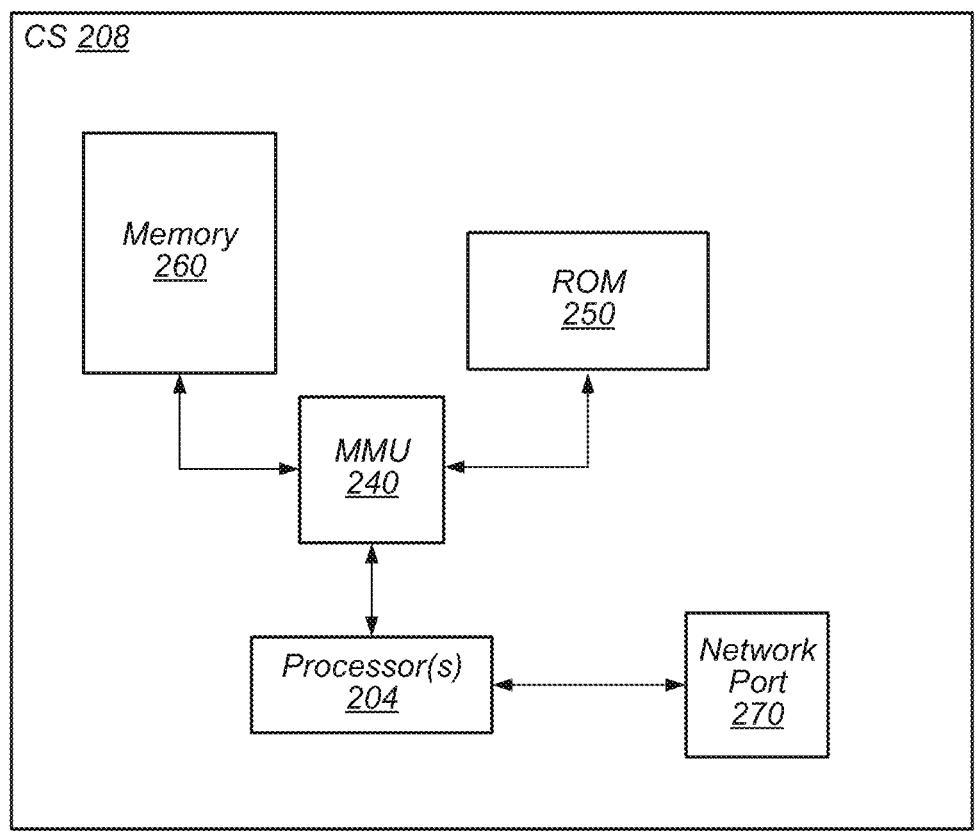
FIG. 2 illustrates an exemplary block diagram of a computer system, according to some embodiments.

FIG. 2—Exemplary Block Diagram of a Computer System

FIG. 2 illustrates an exemplary block diagram of a computer system (e.g., such as a computer system configured to implement a virtual index server), according to some embodiments. It is noted that the computer system (CS) 208 of FIG. 2 is merely one example of a possible computer system. More generally, a computer system may be any computing device that is connectable to a network (such as the internet), and which may be configured to implement a virtual index server, according to embodiments herein. Alternatively, implementation of the virtual index server may be split or distributed among multiple instance of the CS 208. As shown, the computer system may include processor(s) 204 which may execute program instructions for the computer system. The processor(s) 204 may also be coupled to memory management unit (MMU) 240, which may be configured to receive addresses from the processor(s) 204 and translate those addresses to locations in memory (e.g., memory 260 and read-only memory (ROM) 250) or to other circuits or devices.

The computer system may include at least one network port 270. The network port 270 may be configured to couple to a cellular, WiFi, Ethernet, or another type of network to send and receive data packages over an internet protocol (IP) from users, content distribution networks, and/or storage providers. The computer system may include hardware and software components for implementing or supporting implementation of features described herein, such as those described herein with reference to, inter alia, FIGS. 3-22. The processor 204 of the computer system may be configured to implement part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition), the processor 204 of the computer system, in conjunction with one or more of the other components 240, 250, 260, and/or 270, may be configured to implement or support implementation of part or all of the features described herein.

Figure 3:
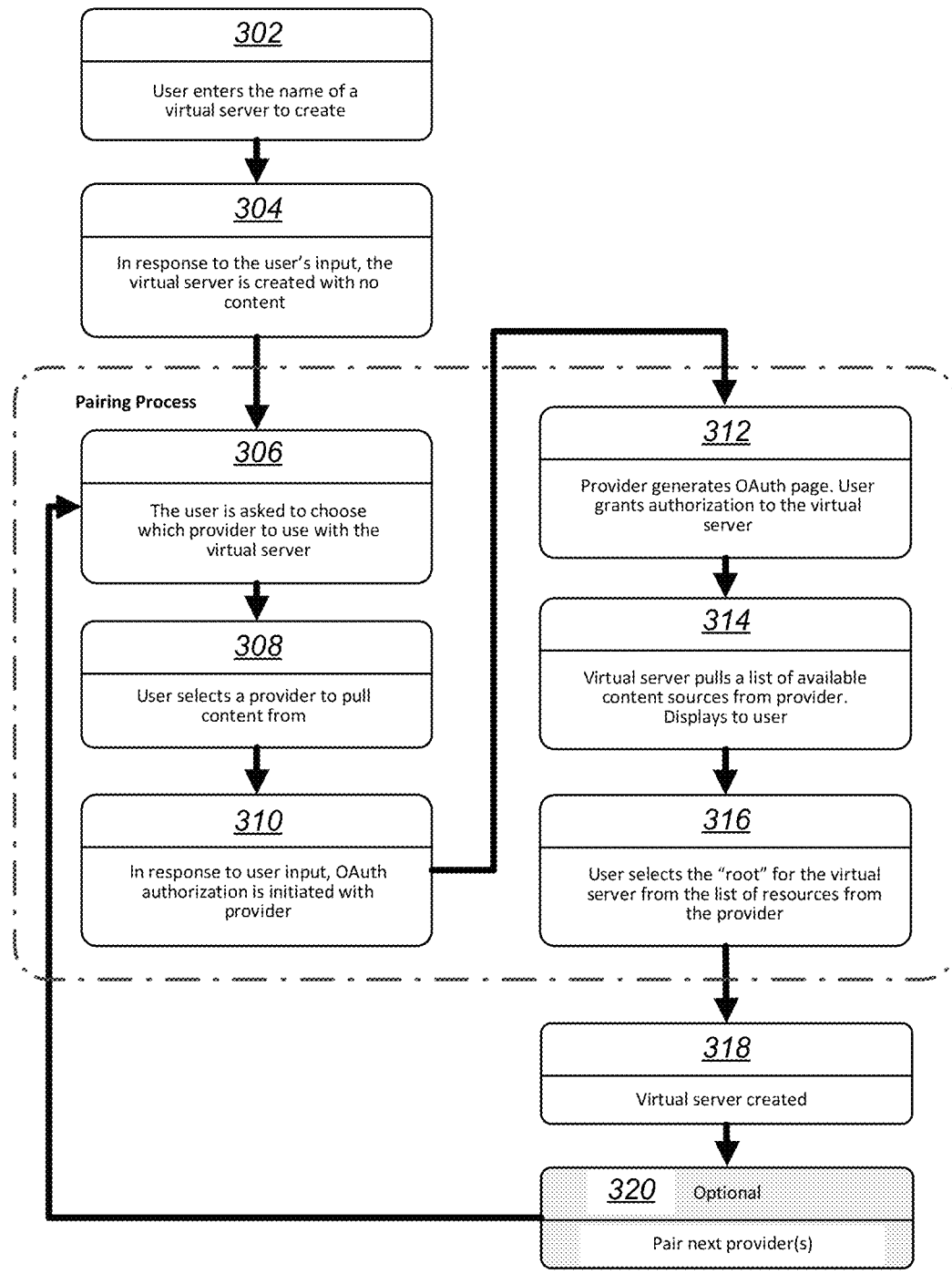
FIG. 3 is a flowchart diagram illustrating a method for pairing one or more storage providers to a virtual index server, according to some embodiments.

FIG. 3—Creation and Pairing of a Storage Provider with a Virtual Server

FIG. 3 is a flowchart diagram illustrating a method for a creation of a virtual index server from a storage provider or multiple storage providers. A user may initiate the flowchart of FIG. 3 by visiting an interface for managing a virtual server. The management interface may be outside the virtual server itself, an installable software package, or may be implemented, wholly or in part, as APIs; in all cases, the results may be relayed to or made available to the virtual server. For example, a user may access the virtual server management interface in a web browser to create and configure the virtual server and pair it with one or more storage providers, among other possibilities. Some of the method elements shown may be performed concurrently, in a different order than shown, or may be omitted. Additional method elements may also be performed as desired. As shown, the method may operate as follows.

At 302, a content publisher may specify the settings to be used for the virtual server. A variety of settings may be customized which control how the virtual server fetches, renders, dynamically processes, caches, manages, flushes, controls access to, indexes, and reports analytics. A name or description may be specified or it may be automatically generated by upon creation. The name may be a Fully Qualified Domain Name (FQDN) or a subdomain prepended to a fixed domain, a descriptive name used, in part, to construct a FQDN, a unique path to be used with a FQDN, or just a descriptive name, among other possibilities. The customizable settings, and how they may affect the functionality of the virtual server, are described in greater detail below.

At 304, once the content publisher enters the virtual HTTP origin configuration, the virtual server may be created. The virtual server may be created, effectively empty or with default contents. For example, the virtual server may be created with a default set of virtual content such as a place holder page (e.g., if no storage providers have been paired yet).

At 306, content publisher may be returned a set of available OAuth (which are defined in, e.g., RFC 5849, RFC 6749, and RFC 6750) storage providers to pair with the virtual server.

At 308, the content publisher may select a storage provider to use with the previously created virtual server and a standard OAuth authentication process may be started.

At 310, an OAuth authentication procedure may be initiated with the provider selected and the content publisher may be redirected to the storage providers website to grant or revalidate authorization permissions.

At 312, the storage provider may generate an authorization page which may include several steps such as a login, selection of content to expose, or settings of specific permissions. The content publisher may grant the virtual server "read" permissions to content, a full or partial visibility of the content stored in the content publisher's account on the storage provider.

At 314, OAuth token may be returned to the virtual server and may be stored in a location accessible by the virtual server. The OAuth token may be used to retrieve credentials from the storage provider suitable for accessing the content publisher's account. The virtual server (or the management interface) may use the credentials to initiate an API Request to the storage provider, which may retrieve a list of applicable content sources to be used in the virtual index server. Examples of available content may include a folder, a group, a branch of code, a repository, a tag, or other types of content found from the storage provider. In some embodiments, only sources granted access in step 312 may be visible.

At 316, content publisher may select data of the storage provider and its relative path in the virtual server. As one example, if Google Docs is paired with the virtual server, it may be assigned a virtualized path of "/MyDocs". In some embodiments, the user may select the virtual server root from the storage provider, but the root that the virtual server sees may be distinct from the native root of the storage provider. For example, the user may choose /PersonalDocs/ in Google Docs as the "root" and may map that to /MyDocs in the virtual server. In some embodiments, the default (e.g., if no path is specified) is to merge the select source into the virtual server root path "/". The assignment of virtualized paths may involve taking a source (or subsource) from one or more storage providers and choosing a virtual path (which may be a URI path) to establish as the "root" for the storage provider's selected data. The default path may be "/" which is itself a virtualized path. This may offer substantial advantages over traditional methods. For example, in existing implementations, users may be required to download content or data from a storage provider, connect to, create, or configure a web server or asset storage, create a directory, or series of directories, and upload each piece of content directly.

In some embodiments, steps 302-316 may be completed in a different order. For example, the content publisher may begin with step 306 by choosing the first storage provider to pair and may proceed to complete each of steps 306-316. After the pairing is completed at 316, the name of the virtual server may be entered at 302 and the virtual server may be created at 304.

At 318, the virtual server may now be paired with the storage provider and ready for use. Depending on the settings assigned in Step 302, and as described in greater detail below, the virtual server may start pre-caching content or performing other operations.

At 320, content publisher may (optionally) return to step 306 and pair additional storage providers with the virtual server. Storage providers may be assigned different virtualized paths or the same virtualized path. When virtualized paths overlap, the virtual server may merge the content from multiple storage providers automatically.

At 320, content publisher may (optionally) return to step 306 or step 314, respectively, to pair additional content from an already paired storage provider. For example, users may want to map multiple folders from Google Docs to a single path on the virtual server. For example, multiple content groups may be paired independently and mapped independently for a single virtual server from a single storage provider.

The process of retrieving content from storage providers may require normalizing content into files and folders which may be further rendered on a virtual server. This content may typically be protected, and managed, edited, processed and accessible through the storage provider's custom API. For example, the purpose of the storage provider may be for editing, collaboration, storage, processing, rendering, or logistics, but not for content distribution. Content publishers today may download the content from these storage providers and upload them to web servers or asset storage services to send to end-users; these many be further paired, by the content publisher, with a CDN. In the case of abstract metadata, such as folders, tags, repositories, branches, groups, content publishers may be required to manually create corresponding folders, with appropriate contents, on a web server or asset storage service to approximate or duplicate the original storage provider hierarchy. Additionally, many storage providers are not designed for easy exporting of content or metadata through their user-interfaces, which may compound the complexity.

In some embodiments, the process of normalization may advantageously be deterministic in that it may be reliably re-created given the same inputs. This may also assist in it being reversible to map back to the original content.

For embodiments where content is being indexed from multiple storage providers, the disparately sourced content may need to be meshed together in a single coherent index. For example, content may be taken from multiple paired storage providers and virtualized into a hierarchy (index) of files and folders on the virtual server. This may involve individually normalizing the content from each storage provider, as described above, mapping the content from storage providers to paths on the virtual index server, and then "meshing" or "merging" the individual conglomeration of paths together to create a single index. In currently existing implementations, they may involve the user going to multiple storage providers, and performing the manual process described in normalizing the content into an HTTP server. This is an extremely time consuming and difficult task today to do manually, especially when content overlaps, which may be substantially alleviated by employing embodiments described herein.

Figure 4:
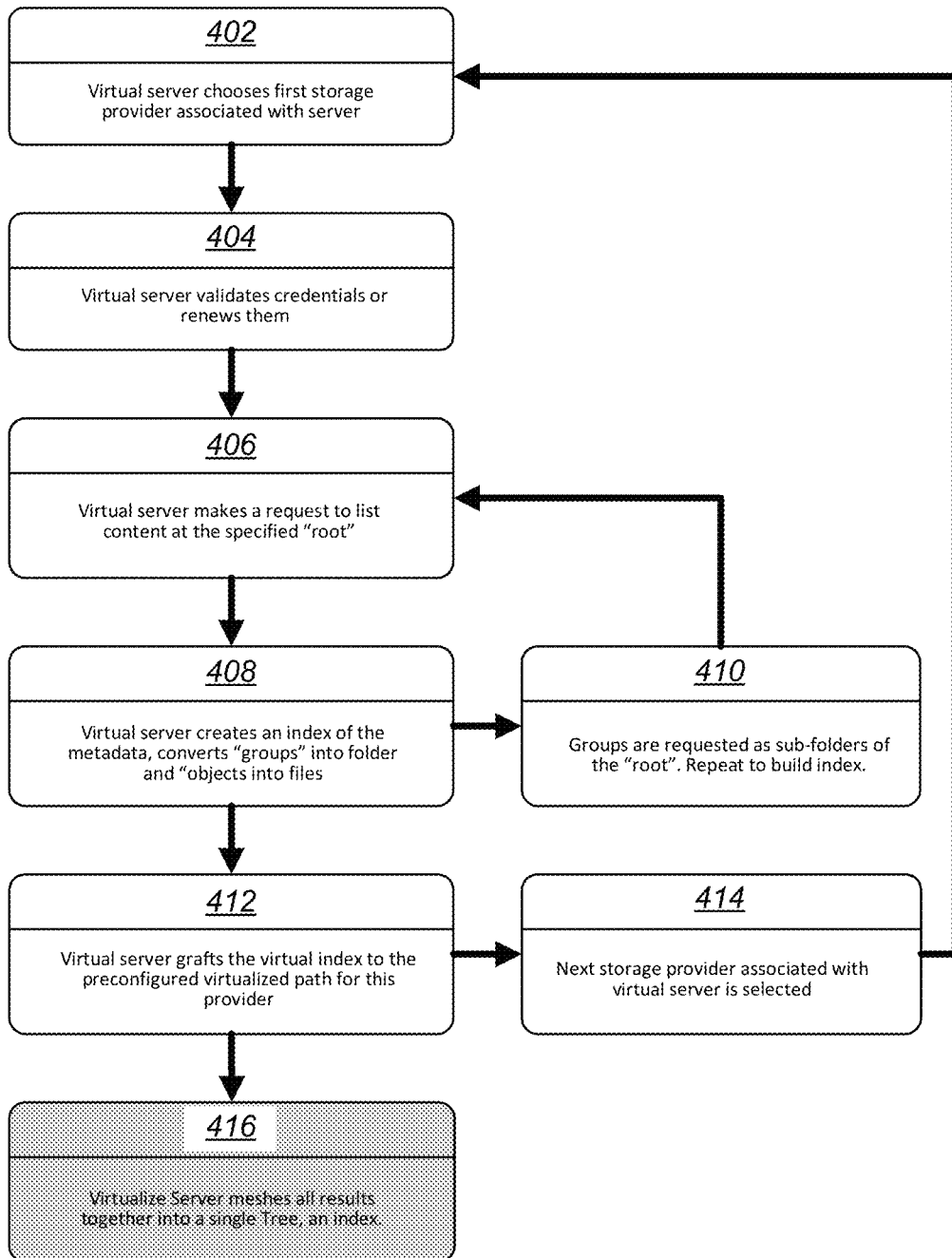
FIG. 4 is a flowchart diagram illustrating a detailed method for constructing a virtual index server, according to some embodiments.

FIG. 4—Creating a Virtualized Server Index from Storage Provider(s)

FIG. 4 is a flowchart diagram illustrating a method for a creation of a virtual index server from the content of a storage provider or multiple storage providers. The process as illustrated may be used in a variety of scenarios depending on how the overall virtual server is configured. Examples of scenarios that may utilize a virtualized server index include pre-caching, automatic updates, responding to end-user or CDN requests, etc. The illustrated process may also include a variety of subprocesses, as described in greater detail below. It may be desirable for an entity that utilizes a virtual index server for the index to be built, retrieved from cache, and/or refreshed, in whole or in part (as described in further detail below, a part of the index may be referred to as a "segment", or "index segment"), in real time or asynchronously. The illustrated process of FIG. 4 provides a high-level overview of how indexes may be created in real time or asynchronously. The virtual index server may be constructed in real time as needed, pre-cached, and updated as necessary based on each of the storage providers' design. Since the virtual index server is a reflection of content on the storage provider(s), it may not be required to actually maintain and update content to match storage providers, as you would with a traditional or asset storage. Multiple content changes may occur on a storage provider before data is requested by an end-user, however only the content at the time of the request may be required. As one example, in traditional implementations, if a user changes a file in his Dropbox, they may then need to download that file, normalize it, upload it to the asset storage, and translate its appropriate location on the server.

Said another way, because the actual content is stored on storage providers, and the construction of a virtual index server can be done in real time (or as needed), and it may not be necessary to duplicate large amounts of content from the storage provider(s). In some embodiments, data may be selectively duplicated (e.g., caching of commonly accessed data), but it may not be required. In contrast, traditional HTTP origins may typically store static copies of all the content that may be served to a content delivery network upon request. Embodiments described herein may offer substantial advantages over traditional web servers and asset storage services (HTTP origins) in cost of storage, ease of deployment, ongoing maintenance, and the manner in which content may be grafted and composed.

FIG. 4 describes a method of grafting/merging content from multiple roots on a storage provider and multiple storage providers together into a single virtual index server. Current state-of-the-art implementations may be able to export content from the storage provider, such as with cloud storage, but you would then manually merge the contents into a series of files and folders. The content publisher may then have to upload them to a web server or asset storage service, manually. Advantageously, embodiments described herein enable different providers with different virtual paths to have their respective content merged to virtually appear to together, as a single unified hierarchy of content.

FIG. 4 describes a full and clean build of a virtual index server, according to some embodiments. Some of the method elements shown may be performed concurrently, in a different order than shown, or may be omitted. Additional method elements may also be performed as desired. As shown, the method may operate as follows.

At 402, the first storage provider associated with the virtual server may be selected from an available pool. The ordering of the storage provider may be chosen in a variety of ways, according to various embodiments. In some embodiments, the ordering may be deterministic to ensure that future renderings will return the same result (i.e., future renderings may not return the same result with random storage provider selection). In various embodiments, selection may be performed alphabetically, based on the virtual path of the respective storage provider in the index, by a provider weight which can be arbitrarily assigned, or by user preference.

At 404, the virtual server may re-validate, renew, and/or re-authenticate credentials. Credentials that were previously obtained may have an expiration built in as some storage providers may expire credentials at regular intervals for security. In the event credentials are expired, the authorization token may be refreshed or renewed before proceeding.

At 406, a list of objects at the specific "root" path ("relative provider root") may be retrieved from the storage provider.

At 408, using the API response from the storage provider, an index of folders may be created from "groups" and files may be created from "objects" or "content", known as a partial virtual index. Specifically, "groups" and "objects" may be taken herein to refer to data located at a storage provider, while "folders" and "files" may be taken to refer to the digital entities in the virtual index that indicate respective groups and objects in storage provider. According to various embodiments, the process of converting groups and objects respectively into an index of folders and files may vary from provider to provider as each has its own custom API and method of presenting this information. In some embodiments, the method for converting groups and objects may vary based on the type of content serviced by the particular storage provider. Additionally, some storage provider APIs may only allow a response of a limited number of objects. They may utilize an API cursor to allow follow-on responses for retrieval of the complete index. This process is described below in further detail below in association with FIG. 6. According to various embodiments, 408 may be performed according to any of the following classifications of groups, among other possibilities.

A. All groups that are immediate descendants of the specified parent group, the relative provider root. A separate call may be made to identify the objects that are immediate descendants of that same relative provider root. Step 410 may be conducted on groups to complete the index.

B. All groups and objects that are immediate descendants of the specified parent group, the relative provider root. Step 410 may be conducted on groups to complete the index.

C. All groups and objects that are descendants, at any depth, of the specified parent group, the relative provider root. Then unneeded content would be filtered from the response. If all details are needed, step 410 may be skipped to prevent recursive calls.

D. All groups that are, at any depth, descendants of the specified parent group, the relative provider root. A separate call would then be made to identify the objects that are immediate descendants of that same relative provider root. Then unneeded content would be filtered from the response. If all details needed are obtained, step 410 may be skipped to prevent recursive calls.

Many storage providers only return immediate descendants of an object/group request. Therefore, at 410, groups may be requested as subfolder of the root. The new relative provider root for each group may be reassigned in step 416. Steps 406-410 may be recursively repeated to build a complete hierarchy of the partial virtualized index.

In some embodiments, a virtual index may be created from a single storage provider with no graft points. In these embodiments, the initial provider root may be mapped to virtual path root equivalent, "/", and there would be no need for grafting or merging content. In these embodiments, the process of constructing an index may end after step 410.

At 412, the partial virtual index may be grafted (or merged) onto the virtual index server at a pre-defined graft point. The graft location may be referred to as the "virtual path", which is mapped to the relative root of the storage provider. The relative root may have descendants which are relative paths or paths of the provider root. Any content on the virtual server in the index may be a virtual path because the path is a virtually assigned relative path of a provider in the index. Relative provider paths in a virtual index server may be virtual paths, as a virtual path may be merged or grafted with other storage provider content and may not directly map to a relative provider root or relative path. According to various embodiments, this may be the actual root of the account, a subfolder, or a branch or other type of group. As explained above, the relative provider root may be selected at step 316 of FIG. 3. When performing step 406, there may be additional steps/API calls required to identify the relative location of the "provider root" before making the requests to index its content. In subsequent requests, the relative provider root may be moved to a child of the previous request and the process may be repeated. Examples of a relative provider root may include an app folder, a subfolder, a branch, an absence of a folder, a group, and a tag. These may also be combined, such as a subfolder of a given branch.

Some embodiments may employ multi-tier grafting, whereby one or more storage providers may be merged, once or more, at different virtualized paths, so that groups and objects stored in structures on the storage provider(s) may appear in a completely different location in the virtual server. For example, a single storage provider may be grafted into a virtual index server multiple times. This may proceed in a variety of ways according to different embodiments. For example, grafting may insert the same provider root at two different virtual paths, two different provider roots at two different virtual paths, two provider roots into one virtual path, or two provider roots that are tiered into each other, such as /provider1/provider2/, among other possibilities. Traditional implementation may require a manual process of downloading the relevant content, creating additional folders, and uploading the relevant content whilst discarding the rest.

The process of multi-tier grafting is described in greater detail below in association with FIG. 5, and the method of grafting in general is explained in further detail in association with FIGS. 16-17.

At 414, if additional storage providers are configured for this virtual server, the next storage provider may be selected using the predefined ordering mechanism, and the entire process of steps 402-412 may be repeated.

At 416, after all storage providers have had their respective partial virtual indexes created and grafted/merged onto the virtual index server, the virtual index server is meshed together into a single tree comprising the complete virtual index server.

Figure 5:
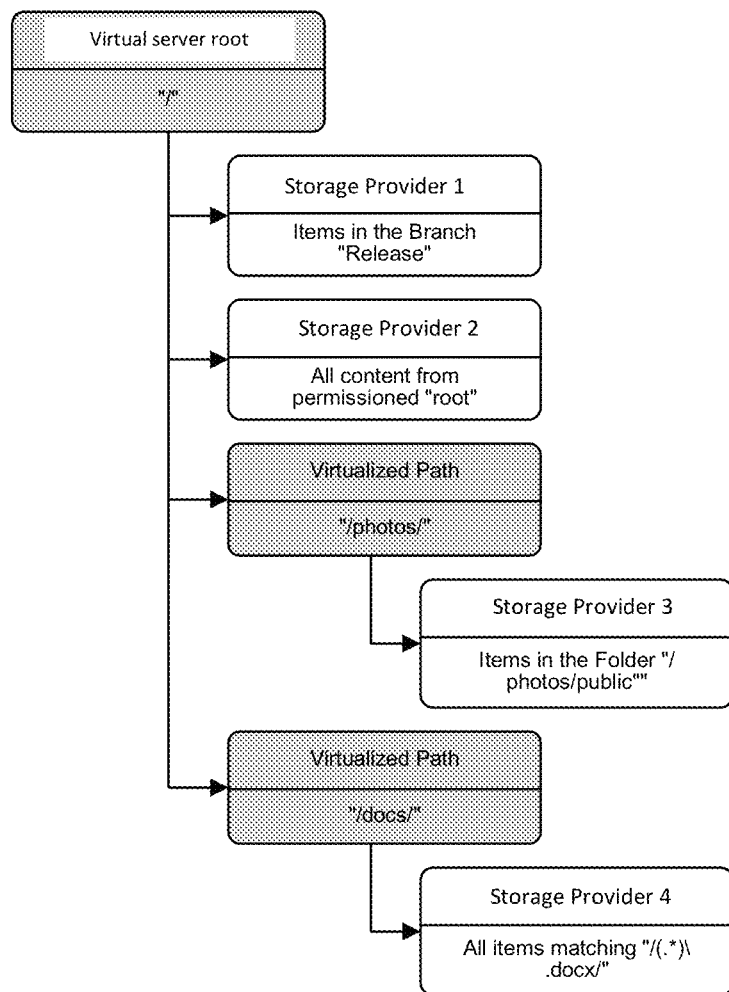
FIG. 5 is an illustration of the structure of an example index sourced from multiple storage providers, according to some embodiments.

FIG. 5—Example Index for Virtual Index Server

FIG. 5 is an illustration of an example index that has been constructed from multiple storage providers, according to some embodiments. FIG. 5 illustrates a specific example of how content may be merged using the method described in FIGS. 3-4.

When a virtual index server ("index") is created, content may be grafted onto a virtual path, which may include the virtualized server root ("/", or "virtual root") or any subdirectory (subfolder) thereof. The content of each storage provider may be merged with content from other storage providers or itself. This process may occur with one or more storage providers or relative roots of a storage provider when they are using a virtualized path that fully or partially overlaps. For example, this process is a subset of the function described above in reference to FIG. 4, steps 412-416.

As illustrated, the virtual server root may be reflected as "/" in the index. FIG. 5 is an example of how four storage providers are grafted and merged to create a single virtual index server. As illustrated, storage provider 1 and storage provider 2 are grafted to and subsequently merged with each other onto the virtual server root. Storage provider 3 is grafted to the folder "/photos" and merged with any overlapping content from storage provider 1 and storage provider 2. Storage provider 4 is grafted to the folder "/docs" and merged with any overlapping content from storage provider 1 and storage provider 2, but not (in this example) with the content from storage provider 3, as they are independent non-overlapping virtual paths. Each storage provider has a different example of filtering input and sourcing groups and objects from the storage provider.

The numbering of the storage providers indicates the order in which they will be rendered, as discussed above in reference to FIG. 3. For example, this controls the way data is grafted and ultimately merged with priority given to the low number, in this example. The branch in the diagram refers to a code branch, but may refer to any grouping method of a content tree on a storage provider. The contents of the first storage provider selected (storage provider 1) of a branch named "release" are grafted into the virtual root.

The graft includes any groups and objects, immediate or descendants. No groups or objects being found is also a valid result, which may result in no objects or groups being grafted to the virtual root. For example, this may be accomplished following the process defined above in reference to FIG. 3, step 316. In some embodiments, further filtering is not performed, and any other code branches may be ignored.

The next storage provider (storage provider 2) may retrieve all content from the relative root of the provider and merge it into the virtual root. In this embodiment, any content that conflicts between storage provider 1 and 2 may be ignored, with storage provider 1 getting the priority. Normalized subfolders (groups) may be merged and not ignored. Conflicting objects in subdirectories may be ignored. Alternatively or in addition, in some embodiments the conflicting content may be renamed slightly to allow for both versions to exist non-degenerately.

The next storage provider (storage provider 3) has a relative provider root of "/photos/public" from which the partial virtual index may be created. The contents of that partial virtual index may be grafted to the virtual path of "/photos". In the event that storage provider 1 or 2, or both, also had a subfolder named "photos", the partial virtual index of the provider may be merged into that subfolder. Any group or object conflicts from storage provider 3 may result in the conflicting content from storage provider 3 being discarded, merged, overwriting existing content, or created as a duplicate entry with a unique name.

The final storage provider (storage provider 4) has a relative provider root of "/", but has a regex filter on objects and groups (in this example, the regex filter specifies only objects ending with ".docx"). When the partial virtual index of a provider is created, storage provider 4 may return objects and groups outside the scope of the filter configured and the virtual server may subsequently discard entries not matching after normalizing the response. In this example, only objects that end in ".docx" are included and all other results are discarded. The contents may be grafted to the virtual path at "/docs". In the event that storage provider 1 or 2 also had a subdirectory named "docs" in the provider root, the provider index from storage provider 4 may be merged into that. In this embodiment, any object conflicts from storage provider 4 may result in its content being discarded. In some embodiments, objects conflicting with previously grafted or merged content may result in objects of storage provider 3 overwriting previous entries or a duplicate entry with a unique name being created.

Importantly, the virtual server root may be statically created, and may exist independently of whether one or more storage providers have grafted content to it. For example, a single storage provider may be grafted to a virtual path other than the virtual root, and in that case, the virtual root may still exist with no entries other than the subfolder where the storage provider is grafted. For embodiments where a single storage provider is paired, the grafting and merging process may be irrelevant. However, filtering may still be relevant, if configured.

In some embodiments, a single storage provider may be grafted at multiple graft points on a single virtual server. This may include using two or more different relative provider roots at different virtual paths (graft points), the same relative provider root at two or more graft points, or a combination where a relative provider root overlaps or encompasses itself in a virtual path. A practical example would be a content publisher storing both a "/docs" and a "/photos" content group on the same storage provider, and only wanting to expose those two groups while excluding the rest. Another example would be grafting and merging two different branches from a single repository to two different virtual paths, such as branch A being mapped to "/development" and branch B being mapped to "/release". As another example, a storage provider may have a folder photos/personal/me that is grafted to the virtual path of /photos, and may then also graft /photos from the storage provider to the virtual path of /photos. Other scenarios are also possible resulting in multiple duplicate and encompassing entries. These types of complex configurations may be difficult to duplicate and maintain manually. Embodiments herein advantageously describe a single provider with multiple graft points, whereby grafting of multiple relative provider roots is performed to multiple virtual paths, for a single provider in a single virtual index server. This may provide the flexibility to publish, or cherry-pick, specific sets of content from a storage provider to make available, while ignoring other content. In existing implementations, this process may be accomplished manually with considerably more effort by the user, e.g., as modifications occur, as the content provider may be forced to download and upload files and folders, normalize content, and reconstruct the merging process to a web server and asset storage service.

Various embodiments may employ different grafting and merging methods, depending on desired function. In the example illustrated in FIG. 5, if groups (subfolders) conflict, the content and sub-content may be merged. In other embodiments, conflicting groups may be completely ignored between conflicting virtual paths or their children. In the above example, in these embodiments, if storage provider 1 or 2 had a group named "photos", the contents of storage provider 3 may be discarded. Alternatively, the graft point itself could be allowed to be merged, but any children groups may be discarded on conflict or they may also be merged. Alternatively, conflicting groups or files may be slightly renamed to allow them to coexist distinctly. This merging process may go through multiple iterations as each storage provider is processed resulting in a unique index.

The process of overwriting grafted points may proceed according to several variations, depending on the desired function. In some embodiments, the previous storage providers partial virtual index may be overwritten, fully or partially, instead of merged. So, in the illustrated example of FIG. 5, if storage provider 1 or 2 had a group named "photos", the contents of it may be discarded and replaced with content of storage provider 3 when grafted. Further, the graft point may be allowed to be merged, but children of the graft point may overwrite any conflicting groups or objects that conflict past the initial merge. To further illustrate the logic, if a 5th storage provider is grafted onto the root illustrated in FIG. 5, and also had a group that conflicted, the content of storage provider 3 may then be overwritten.

In some embodiments, objects may be filtered. In other words, objects may be excluded from the virtual index based on one of the normalized attributes (name, size, file type, etc.), by depth in the provider path from the relative provider root, or by a combination of these. The premise of this application is to limit the content used to create the virtual index server to a specific type or segment of content. In the example of FIG. 5, storage provider 4 has an object filter that restricts results to objects with a normalized name ending in ".docx". This filtering process may occur after the provider index is created and the metadata is normalized into files. Files (objects) not matching the filter may be discarded. In other words, all results are used to create the provider index, the contents are normalized, as described in FIG. 5, and then the relevant filters are used to discard content. After the filter process, the grafting and merging process may occur.

Various different types of filters may be used, according to various embodiments. For example, a regular expression filter may allow for standard regex to include or exclude objects based on the provided pattern. In the example index of FIG. 5, only normalized file names ending in ".docx" may be included. Alternatively, it could be used to exclude any files ending in ".docx" or containing the word "private" in the normalized name. A multipurpose internet mail extensions (MIME) filter may filter based on MIME type. This may be the MIME type as determined by the normalizing process, as typically used/defined in RFC 2045, 2046, 2047, 4288, 4289, and 2049. Storage providers may include or exclude content based on a normalized MIME type. Size filters may be employed, where objects are filtered based on their size in bytes. A filter may be applied to include or exclude only objects above or below a certain size. A depth filter may be employed, wherein depth refers to how many groups the object is descended from the relative provider root. For example, a user may specify a depth of 1 to exclude any sub-groups that may be included in the relative provider root. This filter may be specifically exclusionary.

In some embodiments, groups may be filtered. For example, the same types of logic applied to objects may be applied to groups and sub-groups using pattern matching, inclusion/exclusion filters such as string matching, regular expressions (regex), and depth. Additionally, a content publisher may want to ignore groups that have no content (children, object or groups). This filtering may occur at the very end of the creation of the partial virtual index server, in this case, after step 410 of FIG. 4, and may involve recursively pruning.

Merging, duplication and overwriting graft points and virtual paths is enabled for a virtual index server because the content publishers content is not actually being created or destroyed. In the above example, storage provider 3 may overwrite content from storage provider 1, or vice versa, depending on the configuration. In reality, no content is overwritten, only the representation of the content in the virtual index server as a virtual change. In existing implementations, this process may involve manually and carefully mapping and overwriting content from multiple storage providers. On large repositories, with many providers, or with frequent updates, it may be impractical to manually accomplish this.

In existing implementations, filtering typically occurs for objects and groups through a manual process. Since the current process may involve manually, downloading and uploading content to a web server or asset storage service, the user may need to selectively pick and choose the objects, groups, sub-groups and sub-objects to publish. The complexity of this process may be compounded as content from the storage provider is modified, added to, or removed, where the content publisher is left to sort out the changes. Another example would be pushing from a storage provider to a web server, in which all content would be published and then the unneeded content would be manually pruned. This may become tedious and time consuming with a large set of content or a complex hierarchy of objects and groups. It also may pose a security risk if the web server or asset storage service is publicly accessible while it is conducting the manual process of pushing, and then pruning or filtering un-wanted content.

Embodiments described herein allow publishing of a specific and finite set of content from one or more storage providers into a complex and unique virtual server that may be difficult, if even possible, to duplicate manually.

Figure 6:
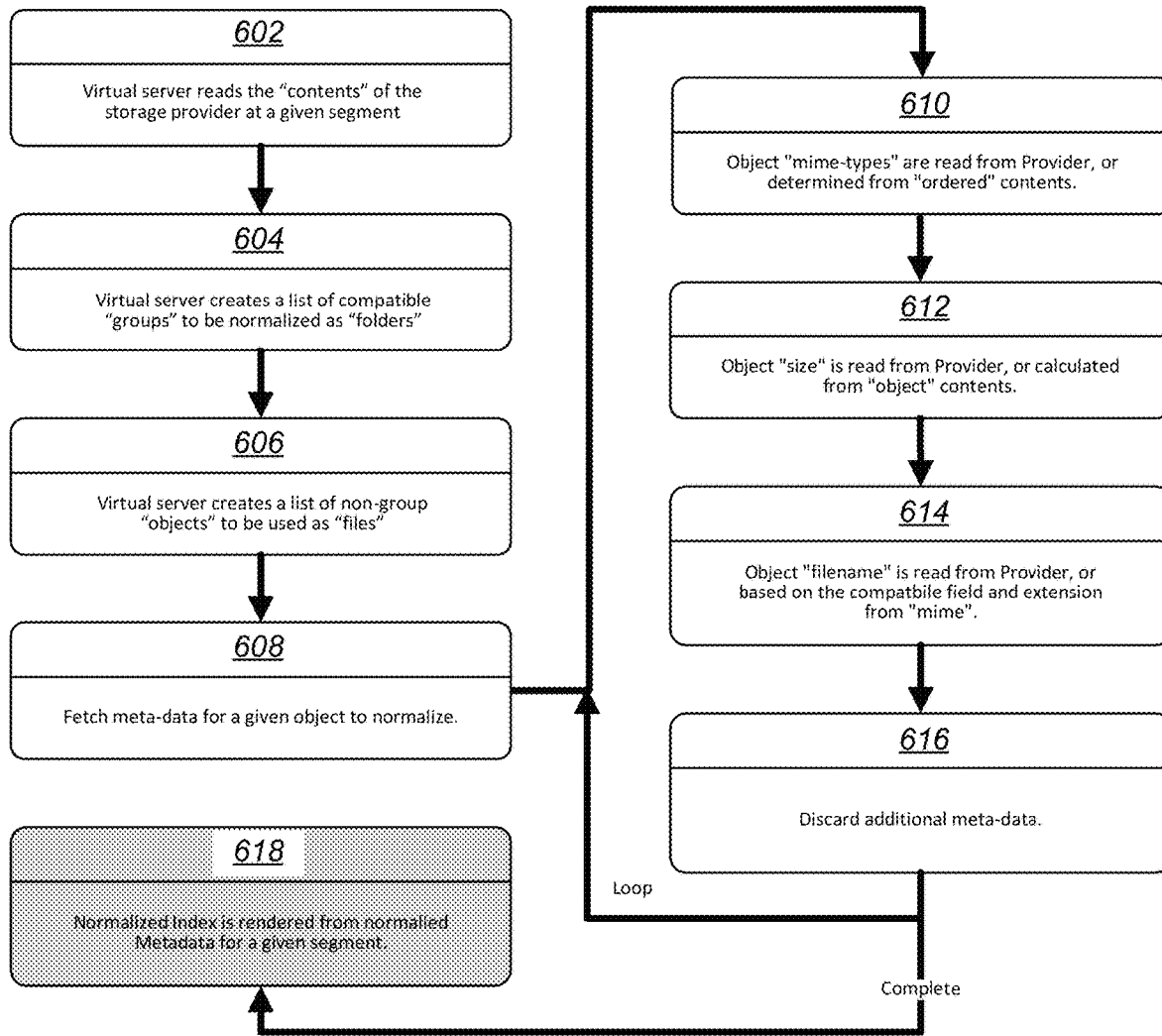
FIG. 6 is a flowchart diagram illustrating a method for normalizing metadata corresponding to files and folders, according to some embodiments.

FIG. 6—Normalizing Storage Provider Content and Metadata into Files and Folders

FIG. 6 is a flowchart diagram illustrating a method for normalizing storage provider content and metadata into a common set of properties, according to some embodiments.

In some embodiments, each storage provider may have a custom application programming interface (API) for accessing content. These APIs may be customized to the type of content the storage provider deals with. Additionally, companies may have a variety of business and engineering reasons to how APIs are structured. As such, it's expected that different storage providers may have different APIs that returns different information about content. The information returned may vary greatly including the nomenclature associated with the metadata, the number and/or types of calls made to retrieve data, and the input requirements.

Regardless of these differences, embodiments herein describe a single virtual index server that may be created in spite of this diversity, by normalizing a common set of properties into usable metadata and objects. Namely, all content referenced in the virtual index server may be normalized into files and folders. The specific property that maps to a given normalized value may be storage provider specific, but may share certain characteristics as explained in further detail below. Additionally, certain properties that may be lacking from the particular data format of a specific storage provider may be generated by the virtual server when the virtual index is created.

There may be advantages for only choosing a specific set of normalized properties. First, a carefully chosen set of normalized properties may be common to many or all applicable services. Second, they may not conflict with the process of merging and grafting; Third, they may support non-files and non-folders.

Table 1 below is a matrix of normalized properties that may be used in some embodiments. Other sets of normalized properties are also possible.

TABLE 1

Normalized properties

| Type | Normalized Value | Storage Provider Mappings |
|---|---|---|
| Folder | ID | Unique ID or Path if not available |
|  | Name | Name of Folder, Group, Branch, or Tag |
|  | Modified | Timestamp of Folder last modification or created date if not available or null. |
| File | ID | Unique ID or Path if not available |
|  | Name | Name of an Object, File, or Subject |
|  | Size | Size of object excluding meta-data |
|  | Mime | Mime type of the object |
|  | Modified | Timestamp of File last modification or created date if modification not available or null. Normalized for all Storage Providers and content. |
|  | Version | The version of the content, or null if not available. |

The "ID" may be unique within the namespace of the storage provider for a given content publisher account.

How these normalized values are arrived at are discussed in more detail in the steps below. The process may begin during the creation of a virtual index as described in FIG. 4. At each segment, the results may be normalized before being assembled, grafted, and/or merged. The normalization process may be repeated for each cycle that metadata is fetched from a storage provider. However, the non-normalized results may be used to walk a storage provider content hierarchy, as the normalized results may no longer align with the groups and objects in a storage provider. What is ultimately grafted and merged in FIG. 4, steps 412-416 may be normalized. The contents of FIG. 5, where grafting and merging are described, may be done with normalized results as well. The normalized values may not be required to match the storage provider exactly.

Some of the method elements shown in FIG. 6 may be performed concurrently, in a different order than shown, or may be omitted. Additional method elements may also be performed as desired. As shown, the method may operate as follows.

At 602, A listing of groups and objects may be read from a storage provider. For example, the virtual server may read content from the storage provider for a particular segment indicated by a content publisher for inclusion within the virtual index.

At 604, the listing may be walked for groups that may be converted to folders. The virtual index server may create a list of compatible groups to be normalized as folders in the virtual index. Groups may be statically defined ahead of any virtual server creation for a given storage provider, and may include branches, repositories, tags, groups, folders, or combinations thereof. Any entries matching the applicable group types for a storage provider may be converted to folders.

Using non-folders as folder groupings may offer advantages over current implementations. For example, using a tag as a folder and placing contents matching that tag the folder may offer a more robust organization for the associated content and may improve the user experience. For example, a tag of "Photo" may place all matching content with that tag a folder in the virtual index named "Photos". Other abstract groupings, such as branches or other group identifiers, may likewise improve the organizational structure of the index. In the cases of branches, tags and abstract groups, content publishers may otherwise have to manually download, curate, and publish the content to traditional web server or asset storage service.

Normalized properties associated with groups may include any of the following properties:

A) The ID of that group, which may be its name, a unique ID, a path, URL, a number, or a combination thereof, may be normalized to its "ID". This field may be optionally excluded, however it may make identifying content for caching, pre-caching, flushing, and updating easier.

B) The name of the group may be the title, subject, name, (or, if no information is available, the ID of that group). Acceptable characters and character-sets may vary according to different embodiments. The name may be unique in the scope of a single group of a folder hierarchy (namespace). In the event that there is a conflict, the data may be discarded or the ID may be, in part or full, or a derivative thereof, appended to the name to make it unique in the namespace.

C) If a created or modified date is provided in the metadata for the group, it may be used as the created or modified date. If no such date is provided, the modified field may be set to null or a comparable default value. Because different storage providers may use different formats for time and dates, this time may be normalized to a standard time format, such as a UNIX timestamp, for all storage providers and content on a virtual server. This field may be optionally excluded.

At 606, the same listing (i.e., the portion of data being processed for normalization) may be walked for objects that may be converted to files. Any objects that were previously normalized to groups may be ignored. Files may be defined as any content that exists as non-metadata that may be downloaded or rendered into a file by the virtual server.

At 608, for each entry in step 606, metadata may be retrieved from the storage provider so objects can be normalized into files or discarded if they do not meet the relevant properties. Normalized properties associated with files may include any of the following properties:

A) The ID of the object, which may be its name, title, subject, URL, a path, a number or comparable unique identifier in the namespace, may be normalized to its "ID". This field may be optionally excluded, although it may make identifying content for caching, pre-caching, and updating easier.

B) The name of the object may be the title, subject, short-description, (or, if no information is available, the ID of the object) acceptable characters and character-sets may vary according to different embodiments. As with folders/groups, the name may be unique in the scope of a single level of a folder hierarchy (namespace). In the event there is a conflict, the data may be discarded or the ID may be, in part or in full, or a derivative thereof, appended to the name to make it unique in the namespace.

C) If the name does not include an extension, an extension may be created from the MIME type or the category of content and appended.

D) The size of the object may be converted to bytes (or another unit that may be relevant for the virtual server). If the size is not provided by the storage provider, it may be calculated dynamically during the normalization process, when the content is pre-cached, and/or when it is retrieved, at the request of an end-user, from the storage provider.

E) The MIME type may be copied from the storage provider when provided. The MIME type may be copied "as is", i.e., without changing the format. If the MIME type is not provided by the storage provider, it may be determined at the same time the size may be determined, and may be calculated by using a standard method such as the Magic Bit, or another method. The MIME type may optionally be ignored and set to null if not immediately available by the storage provider. Additionally, if the MIME is not available via the storage provider and the MIME type calculation is skipped, the MIME type may be defaulted to a standard default, such as an "octet-stream" or compatible default.

F) The "Modified Date" may be provided by the storage provider, and/or may be mapped to several common field types such as the created time, modified time, last modified, etc. Because different storage providers may use different formats for the time and date, this time may be normalized to a standard time format, such as a UNIX timestamp for all storage providers and content on the virtual index server. This field may be optional and set to null, or compatible, if not available.

G) "Version" may be provided by the storage provider to indicate revisions to the content. This field may be optionally excluded, although it may make identifying content for caching, pre-caching, flushing, and updating easier. Modification time, versioning information, and the object size may be useable, as described in further detail below, to detect changes to data content that may be used to initiate automatic updates to the index.

Examples of objects include files such as images, documents, binary executables, text files, archives and any other content traditionally identified as a file. Files may also include non-traditional content. For example, a blog, which consists of titles and bodies, may be rendered into files as well. In these embodiments, the body of the blog may become the text or HTML content of the file, and the title may become the filename.

Using non-file content, static or dynamic, for files may offer advantages over current implementations. For example, the virtual index server may turn a WordPress blog into a hierarchy of files and folders, a Twitter account's tweets into a series of text files, or a chat transcript into a matrix of conversations as HTML or Text files. For example, benefits of converting non-file content into files of the index may include backfilling details like the size of the content by dynamically calculating it to make it HTTP compatible.

In some embodiments, steps 606 and 608 may be combined by storage providers by providing a listing that includes the relevant metadata. In other embodiments, metadata may be pulled for multiple objects at once in step 608, once the objects have been identified in step 606.

Case sensitivity and character set differences may be handled in different ways, according to various embodiments. For example, normalized names may be kept in the index as case-sensitive, as provided by the storage provider. In these embodiments, conflicting objects with different names may not conflict. In other embodiments, all names may be normalized to lower case and to a uniform character set, such as UTF-8, in which case comparable names that would conflict may be merged, overwritten or discarded. Either methodology may apply to both files and folders.

At 610, object mime type may be read from the storage provider, and/or determined from the object. The object mime type may be normalized as described above in step 608, property E.

At 612, object size may be read from the storage provider and/or determined from object contents, and the object size may be normalized as described above in step 608 property D.

At 614, the object filename may be read from the storage provider and/or determined from compatible field and extension, and the object filename may be normalized as described above in step 608 property B.

At 616, additional meta-data may be discarded. For example, in some embodiments, properties A, F, and G as described in step 608 may not be used for a particular index, and their associated metadata may be discarded.

At 618, the normalized virtual index may be rendered from the normalized metadata for a given portion of data (i.e., "segment"). The virtual index segment (equivalently referred to above as a "partial virtual index") has then been normalized.

The normalization method described in reference to FIG. 6 enables a coherent and unified index to organize data from disparate storage providers (or from disparate formats employed within a single storage provider). Normalizing files and folders from dissimilar services advantageously presents a unified virtual index server that merges and grafts content, and determines hierarchy and priority. The normalization process is important to this unification, as it removes the need to manually export and match object and group details between storage providers. The less traditional the storage provider is, the more difficult it may be to manually match or construct its metadata. An end goal of the virtual index server may be to publish content for consumption by end users. As such, the normalized data (such as name) need not exactly match the storage provider. In fact, the manual process may often see this metadata changed anyway in unpredictable ways, whereas embodiments described herein to normalize the metadata may provide a consistent and deterministic framework for merging disparate data into a unified taxonomy.

Figure 7:
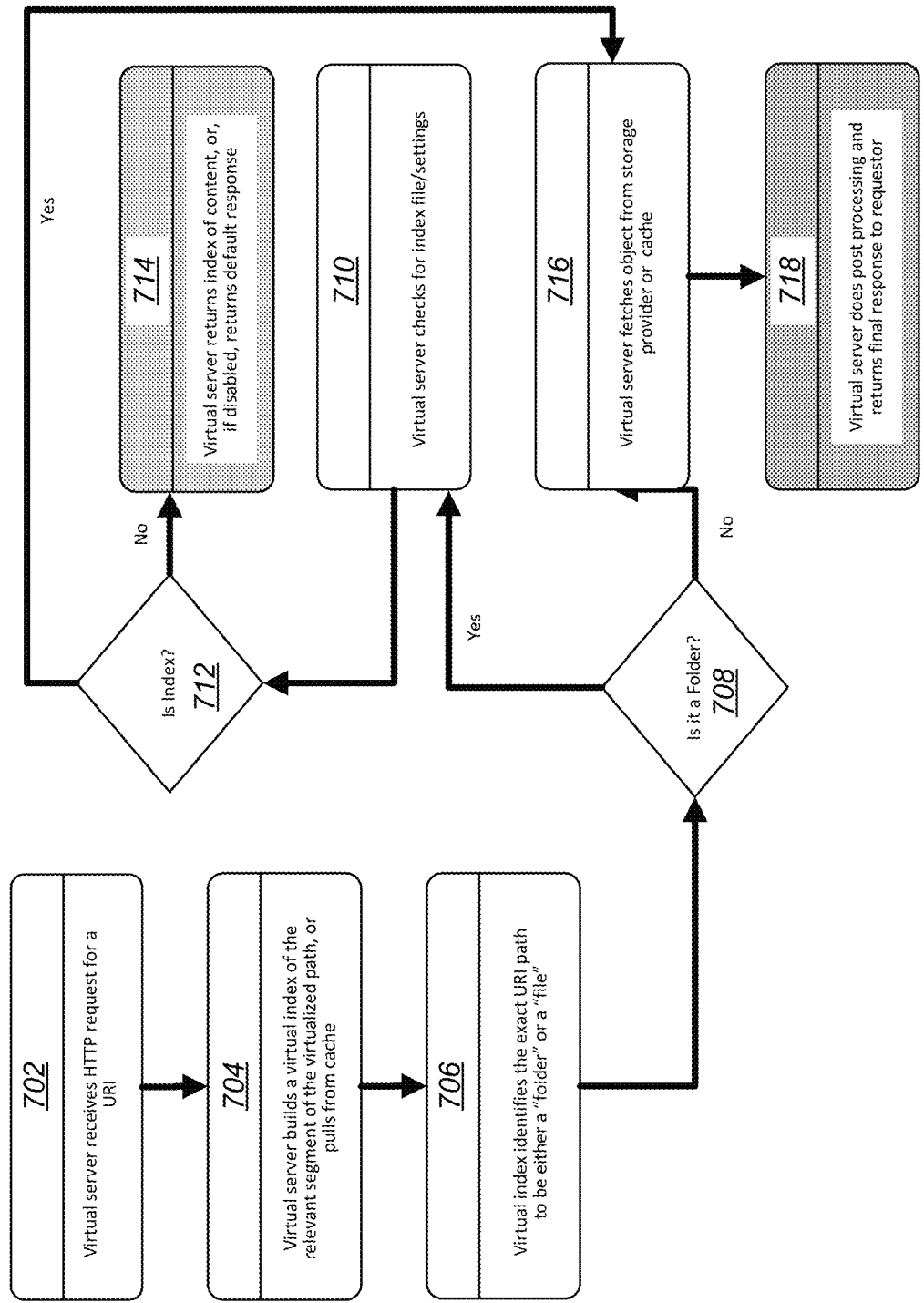
FIG. 7 is a flowchart diagram illustrating a method for retrieving data content based on object or group, according to some embodiments.

FIG. 7—Determining if a Request to a Virtual Server is for an Object or a Group FIG. 7 is a flowchart diagram illustrating a method for determining if a request to a virtual server is for an object or a group, according to some embodiments. This process may be used to determine whether a request from an end user to a content delivery network is for an object (file) or a group (folder) in a virtual index. The described steps may be used in combination with a virtual index server. Some of the method elements shown in FIG. 7 may be performed concurrently, in a different order than shown, or may be omitted. Additional method elements may also be performed as desired. As shown, the method may operate as follows.

At 702, the virtual index server may receive an HTTP request for a uniform resource locator (URL). The request may be received from an end user, from a content distribution network (CDN), or from another entity.

At 704, an index may be created, (e.g., as described above in reference to FIG. 4, or may be pulled from a cache. The virtual index server may build or pull only the segment of the index that is relevant to the HTTP request.

At 706, the exact uniform resource identifier (URI) path may be identified which may map to a path in the index as a file, a folder, or a subfolder (or may not be found). According to different embodiments, case sensitivity and character set of the URI may be treated differently. For example, the virtual index server may normalize URIs to lowercase, or may keep the URIs as case sensitive. Additionally, case sensitivity may be applied to the normalizing process, and may not be applied to the inbound requests to the server. Additionally, character filters may be applied to inbound requests in addition to case sensitivity changes.

At 708, it may be determined if the URI path maps to a folder. In the event that the URI path does not map to a folder or a file, the method may terminate. For example, if no file or folder is found at the specified URI, the server may take one of several actions including a HTTP error code, returning a default result, or redirecting the user to a pre-defined URL. If it is determined that the URI path maps to a file, the method may proceed to step 716, below.

At 710, if it is determined that a folder exists at the requested URI, the virtual server may check for index file settings. If enabled, a valid "index" file may be checked for as an immediate descendant of the folder identified at step 708.

At 712, it may be determined whether the index is enabled and found in the folder, or is not enabled or not found.

At 714, if an index file is not enabled or not found, in one embodiment, a fancy index of the virtual index segment may be rendered as HTML or text to the user. Fancy indexing may be enabled or disabled, at the option of the operator (e.g., the content publisher) of the virtual index server, according to some embodiments. As described herein, fancy indexing may show the contents, in the form of files and folders, of a virtual index segment as HTML when a folder is requested and no folder index is available (or that functionality is disabled). In another embodiment, a default response may be returned without a content listing.

At 716, if an index file is enabled and found, the URI may point to a file. The file may be read from cache or from the storage provider, or the URI may point to a folder where there may be an index file available which is read from cache or from the storage provider. When a file is not in cache, it may be read from a storage provider. At that time, in some embodiments it may be returned to the requesting end-user or CDN and simultaneously be cached to disk for future requests.

A folder index file may have a configurable name, but may typically be named "index.htm", "index.html", "default.html", etc. If a server is configured for post-processing, default files may include extensions for that post-processing tool. For example, a post-processing tool such as PHP may accept an index file named "index.php".

At 718, post processing may be performed for the file or folder index file, and the processed content may be returned to the requestor. As described herein (and as described in greater detail below in reference to FIG. 8), post processing is a process of processing content through an algorithm, tool, filter, compiler, etc., as may be specified by the content publisher before returning it to the end-user or CDN. This step may also be done either before or after content is stored in cache depending on the type of post-processing needed. The method described above in reference to FIG. 7 may advantageously function on a virtual index server, whereas traditional implementations may only function on static content stored on a file system.

Figure 8:
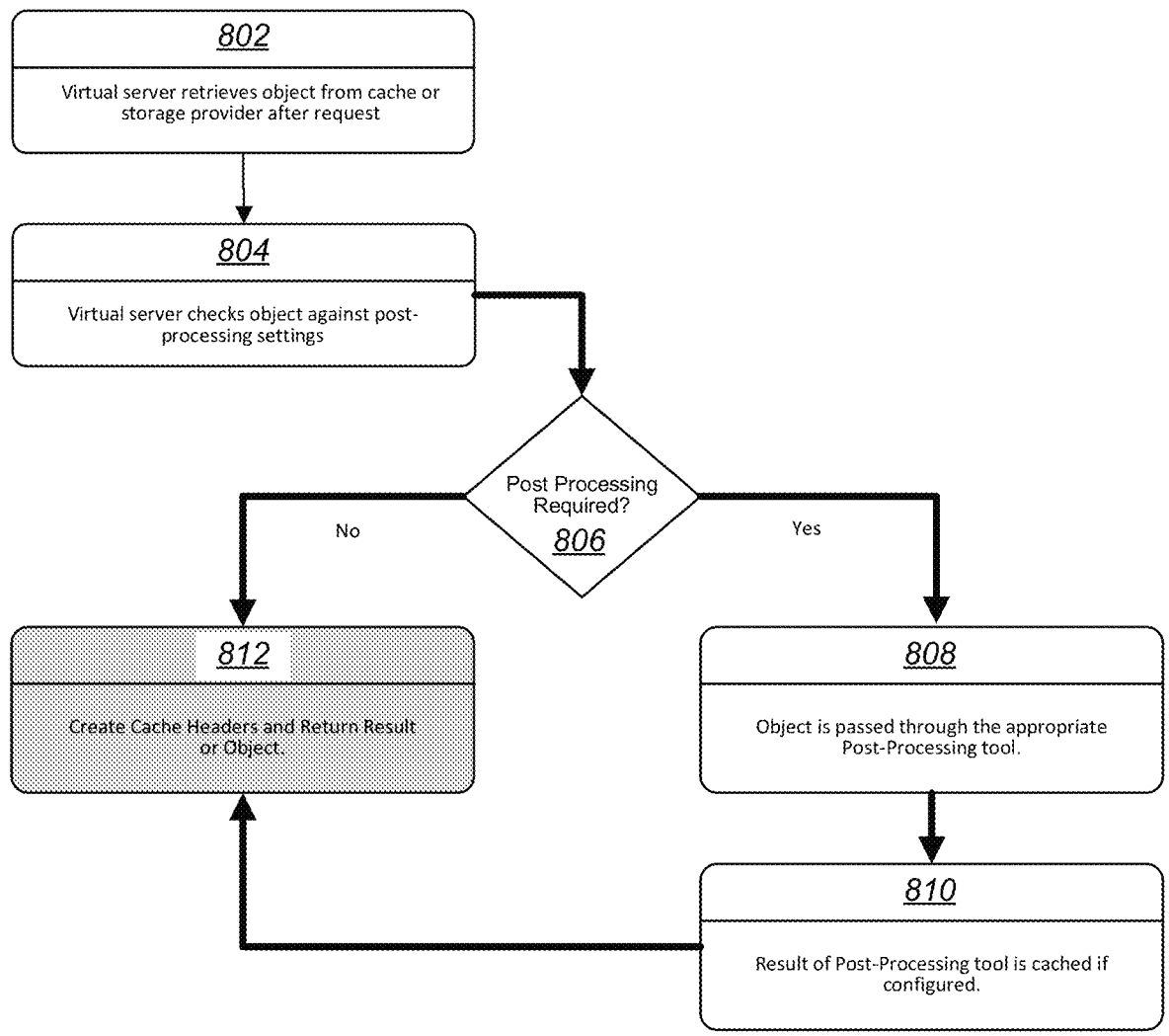
FIG. 8 is a flowchart diagram illustrating a method for post-processing of retrieved data content, according to some embodiments.

FIG. 8—Post Processing on an Object from a Storage Provider by a Virtual Server

FIG. 8 is a flowchart diagram illustrating a method for conducting post processing on a portion of data. As described herein, post processing may refer to the mechanism to pass objects originally pulled from storage providers through a processing mechanism on the virtual server. This post processing may take many forms, but often it may be used for functions such as rendering files that contain source code into a final result, such as processing a PHP file into byte code, running the PHP code and capturing the final result, or applying an after effect, such as watermarking an image before delivering it. Some of the method elements shown in FIG. 8 may be performed concurrently, in a different order than shown, or may be omitted. Additional method elements may also be performed as desired. As shown, the method may operate as follows.

At 802, content may be pulled from the storage provider or pulled from a cache on the virtual index server, initiating post processing.

At 804, it may be determined if the object is the appropriate MIME type or has the appropriate file extension for post processing. Alternatively, step 804 may be skipped if the operator of the virtual index server has configured all responses to be post-processed, and/or post processing may be disabled for all content.

At 806, it may be determined if post processing is required. For example, post processing may be configured by the virtual index server to be performed on particular file types, or for objects having a particular MIME type or file extension. If it is determined that post processing is not required, the method may proceed to step 812.

At 808, if it is determined that post processing is required, the Object may be passed to the appropriate tool for processing. For example, as described above, files containing source code may be rendered, and/or watermarks may be applied, among other possibilities. In some embodiments, objects may be only passed through post processing once: either when they are read from the storage provider and then delivered to the requestor and/or written to cache on the virtualized server, or when they are read from cache on the virtualized server, and delivered to the requestor. For example, a PHP may need to be post processed each time a new request arrives, so the post processing may need to be done at the time of the request, and the original object would be stored in cache. An image watermark, on the other hand may, be stored in cache with the watermark applied and subsequent requests may skip post-processing.

Various protocols may be employed in the case that the post-processing fails. For example, the configuration may allow for the original content to be returned without processing, an HTTP error may be returned (such as 500 Internal Server Error), error content specific to the expected post processing mime-type may be returned (e.g., an error image if an image is requested), or the result may forward to a content publisher-defined error URL.

In some embodiments, cache headers may be specified based on the type of post-processing. For example, it may be desirable for a PHP file that is post processed to have extremely limited caching, whereas a watermarked image may work well with a much longer cache period. HTTP and CDN caching options may be determined on a per post-processing type basis.

At 810, the result of the post processing may replace the original content of the object. The original content may be discarded. This post-processed content may additionally be cached in lieu of the original content, for use in future requests.

At 812, the original object contents may be returned if no post-processing was needed, or the post-processed version may be returned. In the event post-processing is used at step 810, a special set of cache headers may be returned as well which are specific to the post-processing type.

An advantage of the methods described in reference to FIG. 8 is that post processing may be paired with the virtual index server. As a practical example, a content provider's photo service may be paired with the virtual server, automatically watermark all the images, and make them publicly available without having to copy/duplicate and process them from the original service.

Figure 9:
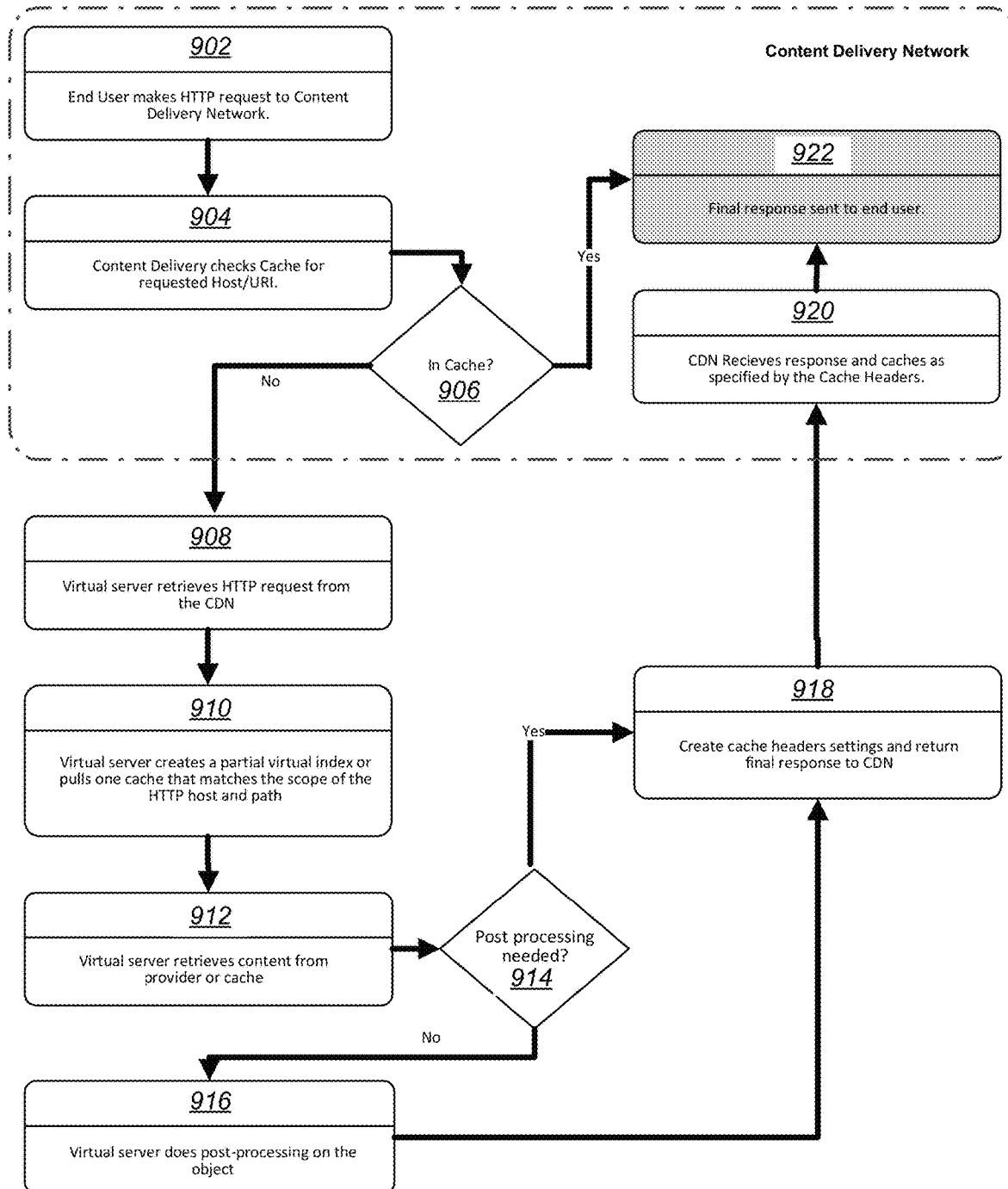
FIG. 9 is a flowchart diagram illustrating a method for processing data content requests from a content distribution network, according to some embodiments.

FIG. 9—a Content Request from a Content Delivery Network to a Virtualized Server FIG. 9 is a flowchart diagram illustrating a method for processing a content request from a content delivery network ("CDN") to a virtual index server, which may occur when an end-user makes a request to the CDN, or when the virtual server is performing a pre-caching process to the CDN. Some of the method elements shown in FIG. 9 may be performed concurrently, in a different order than shown, or may be omitted. Additional method elements may also be performed as desired. As shown, the method may operate as follows.

At 902, an end-user makes an HTTP request to the CDN.

At 904, the CDN may check its cache for the requested host/URI. As described below, the CDN may respond to the request based on previously cached data if available.

At 906, it may be determined if the content is in the cache. If the content is in the cache, the method may proceed to step 922.

At 908, if it is determined that the requested content is not in the cache (or needs to revalidate content from the virtual index server), the CDN may make a request to the virtual index server corresponding to the original end user request.

In some embodiments, the request from the CDN to the virtual index server may be a "Modified Since" (or comparable) request, and may not result in the return of content or post processing. For example, a CDN may request to know if a previous request has changed since it was last requested. This is commonly done through an HTTP If-Modified-Since request. The virtual index server may use a virtual index and modified time to provide a date/time response to the CDN of when the content was last modified or a comparable HTTP code indicating no modification has occurred. If the content has not been updated, the CDN may service the request from cache and there may not be a need for the virtual index server to return any actual content to the CDN or retrieve it from the storage provider.

At 910, the virtual index server may determine the virtual index to use for this request through the hostname and domain name of the HTTP request. This name may be aligned with name input by the content publisher (e.g., as described above in reference to FIG. 3). The appropriate virtual index may be rendered or pulled from cache, fully or partially, as described above in reference to FIG. 4.

At 912, the virtual index server may retrieve content from the storage provider or cache. Content may include objects and groups as described above in reference to FIG. 7.

At 914, it the virtual index server may determine if the content is in need of post processing.

At 916, if the content was in need of post processing, the virtual index server may perform post-processing on the content. If any post-processing is configured or applicable, it may be performed in accordance with FIG. 8, described above. Post processing is shown in FIG. 9 to occur in step 916, after content is not found in cache and is pulled from the storage provider. In other embodiments, content may also be found in cache and have already had post-processing in which case step 916 may be skipped.

If post-processing has already been done before caching, step 916 may be skipped and the method may proceed to step 918.

At 918, cache headers may be created based on the virtual server configuration, the MIME type, the post processing, or a combination. The virtual index server may then return the result of the request to the CDN. Cache header defaults may depend partially on what a given CDN will support and there may be custom headers specific to a CDN. Cache Headers may, generally, be passed through to the end-user and not just used for subsequent caching on the CDN (e.g., at step 920). Content that requires continual post-processing may be lightly cached if at all. Content that is static may be cached for longer periods and revalidated as needed by the CDN to the virtual index server.

At 920, the CDN receives the response from the virtual index server, and may cache the received content as specified by the cache headers. In various embodiments, CDNs vary greatly in how they handle caching, internal request tiering, requests to the virtual index server, and responses from the virtual index server.

At 922, after the CDN either retrieved the content from its own cache (at 906), or received the content from the virtual index server (at 918), the CDN may send the final response to the end-user.

In current implementations, a CDN may pull from an HTTP Origin which is composed of a traditional HTTP (web) Server that serves static assets, dynamic assets, or both. In the embodiments described in FIG. 9, content may be dynamically determined from storage providers by a virtual index server, and then delivered on-demand to the CDN. As is described above in association with FIGS. 3-7, this process may allow for a great amount of flexibility and advantages over traditional web servers and asset storage services.

Figure 10:
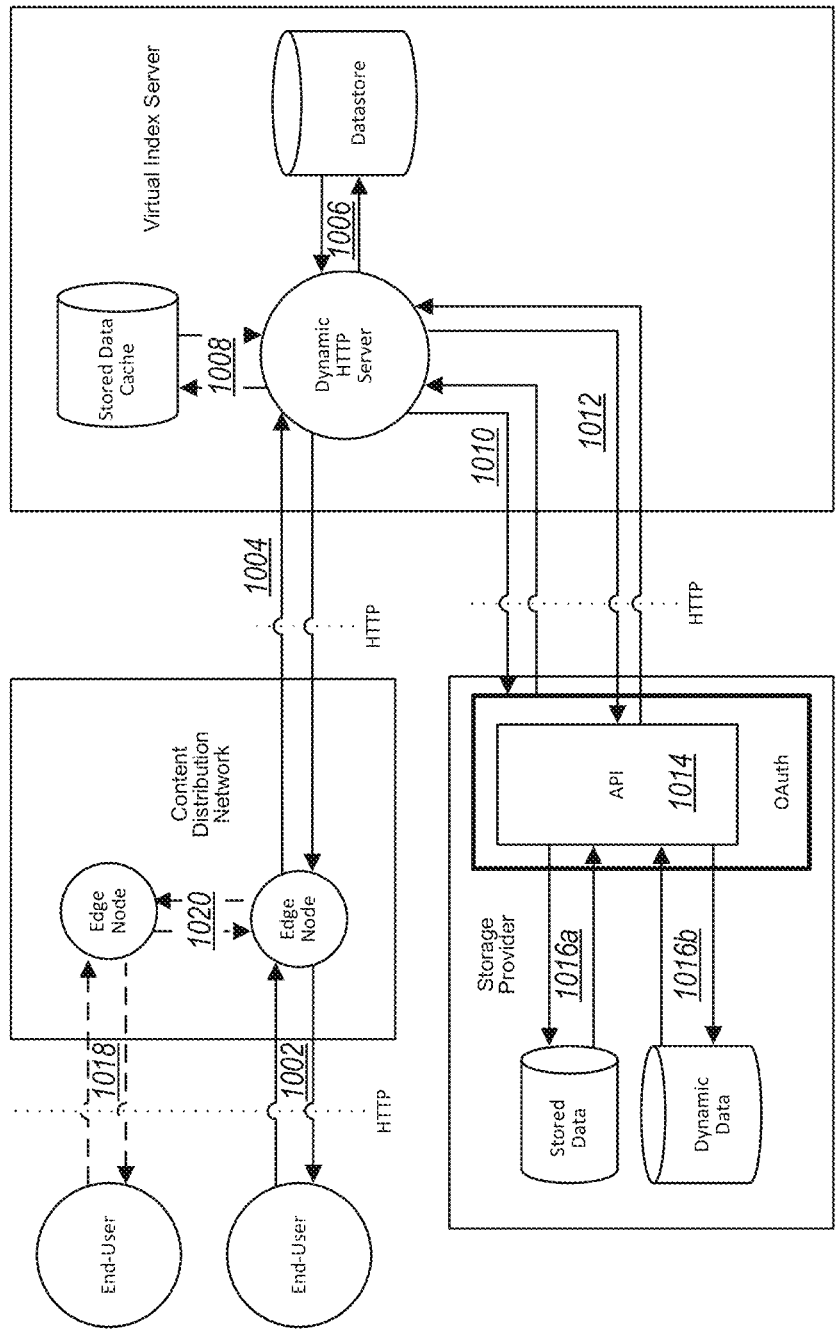
FIG. 10 is a communication flow diagram illustrating a method for utilizing a virtual index server, according to some embodiments.

FIG. 10—Utilizing a Virtual Index Server

FIG. 10 is a communication flow diagram illustrating a method for utilizing a virtual index server, according to some embodiments. The method steps of FIG. 10 closely parallel the method described in reference to, inter alia, FIGS. 9 and 12. However, FIG. 10 describes additional detail regarding the physical entities and components which may be involved in each step, according to some embodiments. Some of the method elements shown in FIG. 10 may be performed concurrently, in a different order than shown, or may be omitted. Additional method elements may also be performed as desired. As shown, the method may operate as follows.

At 1002, a request from an end user for one or more portions of data is made to an edge node of the CDN.

At 1004, The CDN, in turn, forwards the request to the configured HTTP Origin which is the virtual index server.

At 1006, the virtual index server checks the request headers against the datastore, specifically determining the host and domain (the Server) of the request. If it is not configured, the request may be rejected and a default response returned. If configured, the authorization and metadata, which may include a virtual index, may be returned to the virtual index server. As illustrated in FIG. 10, the datastore is located within the virtual index server. However, in some embodiments, the datastore may be comprised within a separate physical server from the virtual index server.

At 1008, the stored data cache is checked, if configured, to see if the content path requested by the CDN exists for the given virtual server. If the content is found in the cache, the response is constructed from the metadata fetched from the database and the content is pulled from the stored data cache. As illustrated in FIG. 10, the stored data cache is located within the virtual index server. However, in some embodiments, the stored data cache may be comprised within a separate physical server from the virtual index server.

At 1010, if the content is not available in the stored data cache, it has expired, or the stored data cache is not configured, the authorization credentials may be inspected by the storage provider (i.e., the storage provider associated with the requested portion of content). If they have expired, the virtual index server may contact the storage providers authentication API's (e.g., OAuth API in FIG. 10) to renew or refresh the credentials. They may be subsequently stored in the datastore.

At 1012, the request for the content is made to the storage provider API using the authorization credentials previously obtained. Depending on the API, this may require a series of requests to map the meta-container, typically a folder or group, to the path requested in step 1004. Alternatively, mapping may also have been previously retrieved, subsequently cached, and stored in the datastore. Once the path is mapped, the content and/or content metadata may be requested from the API's stored data and/or dynamic datastore at steps 1016a-1016b. The physical content is requested through a specific content API and is constructed by the storage provider from either the static datastore (1016a), the dynamic datastore (1016b), or a combination of both.

At 1018, multiple requests may originate from additional end-user(s) to different edge nodes in the CDN, which may have different geographic locations. At 1020, the multiple edge nodes may communicate with each other, to coordinate interactions with the virtual index server.

Figure 11:
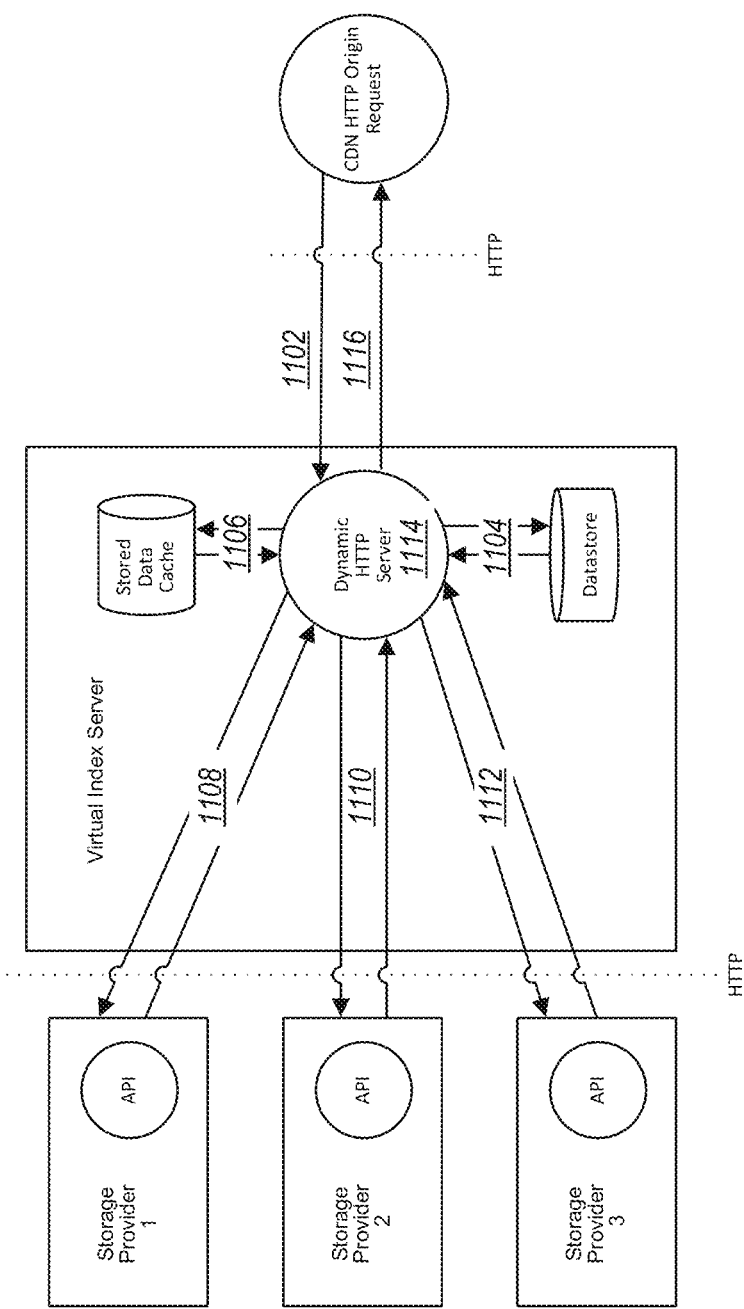
FIG. 11 is a communication flow diagram illustrating a method for linking multiple storage providers to a virtual index server, according to some embodiments.

FIG. 11—Linking Multiple Storage Providers to a Virtual Index Server

FIG. 11 is a system-level communication flow diagram illustrating a method for linking multiple storage providers to a virtual index server, according to some embodiments. The method steps of FIG. 11 closely parallel the method described in reference to, inter alia, FIGS. 3-4 and 12.

However, FIG. 11 describes additional detail regarding the physical entities and components which may be involved in each step, according to some embodiments. Some of the method elements shown in FIG. 11 may be performed concurrently, in a different order than shown, or may be omitted. Additional method elements may also be performed as desired. As shown, the method may operate as follows.

At 1102, a request is made by the CDN to the virtual index server for a portion or portions of data.

At 1104, the datastore of the virtual index server is checked to validate the request and the response is constructed. As illustrated in FIG. 11, the datastore is located within the virtual index server. However, in some embodiments, the datastore may be comprised within a separate physical server from the virtual index server.

At 1106, the stored data cache of the virtual index server is checked. If a cached response is found, it may be returned immediately to the CDN in step 1116. Otherwise, a response may be created from one or more storage providers. As illustrated in FIG. 11, the stored data cache is located within the virtual index server. However, in some embodiments, the stored data cache may be comprised within a separate physical server from the virtual index server.

At 1108, the first storage provider is contacted as is described in FIG. 10. The metadata may be pulled and the static content may be requested, if needed.

At 1110, the second storage provider is contacted as is described in FIG. 10. The metadata may be pulled and the static content may be requested, if needed.

At 1112, the third storage provider is contacted as is described in FIG. 10. The metadata may be pulled and the static content may be requested, if needed. More storage providers (not shown) may additionally be contacted as needed.

At 1114, the results from each storage provider are merged together to create a virtual index of the virtual index server. The path received in the request at step 1102 is compared to the index and the content from that storage provider is returned. In the event a fancy index is requested, a partial virtual index inclusive of all storage providers, grafted and meshed, with relevant normalized metadata at the requested virtual path may be returned.

Finally, at 1116, the response is returned to the CDN.

Figure 12A:
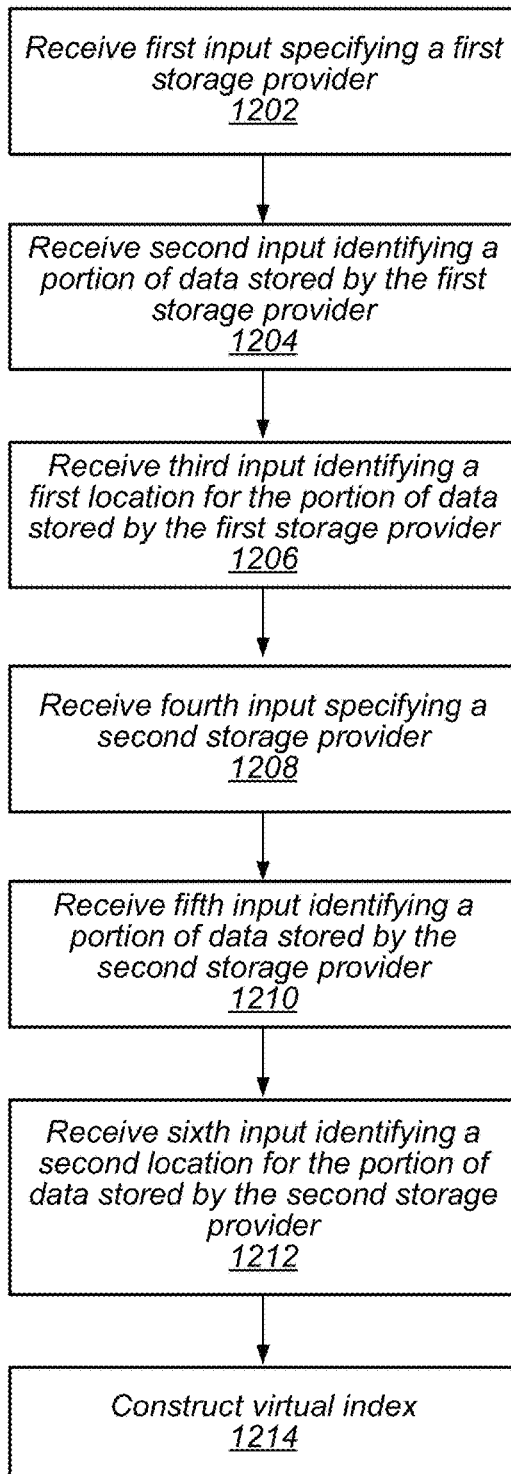
FIGS. 12a-12b are flowchart diagrams illustrating a method for constructing and using a virtual index server, respectively, according to some embodiments.
Figure 12B:
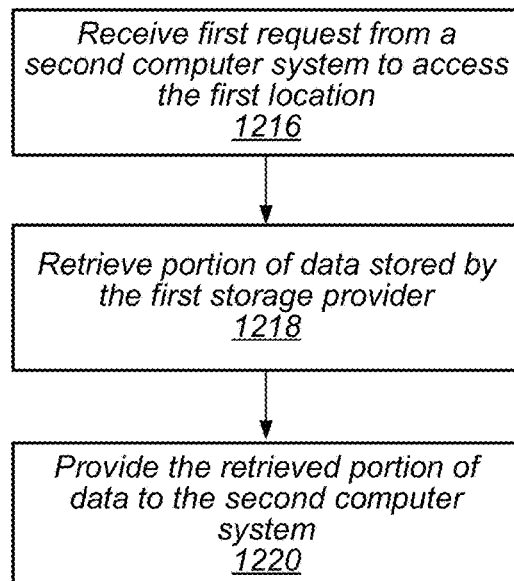

FIGS. 12a-12b—Constructing a Virtual Index Server

FIGS. 12a and 12b are flowchart diagrams illustrating a high-level overview of a method for using a virtual index server to construct and use an index, respectively, according to some embodiments. Some of the method elements shown may be performed concurrently, in a different order than shown, or may be omitted. Additional method elements may also be performed as desired. As shown, the method may operate as follows.

At 1202, a first computer system may receive first user input specifying a first storage provider for a virtual index of a virtual index server. For example, the first computer system may receive input specifying a storage provider that contains data to be included in the virtual index. The virtual index, the construction of which is described in detail below, may be stored on the virtual index server, in a separate datastore, or not stored at all and created as needed, and may indicate or refer to a plurality of portions (partial virtual index's or segments) of data stored at a plurality of storage providers. As understood herein, a "portion of data" may be taken to mean any combination of folders, subfolders, files, or other types of data or segments of data.

At 1204, the first computer system may receive second user input identifying a first portion of data stored by the first storage provider for inclusion in the index of the virtual index server. The first portion of data may be of a variety of types. For example, the first portion of data may comprise a folder, as well as all of the subfolders and files contained within the folder. The first portion of data may comprise multiple independent folders stored by the first storage provider, which may each contain one or more files and/or one or more subfolders. The first portion of data may also be of another type, as variously described above (e.g., entries in a blog post or another type of data).

At 1206, the first computer system may receive third user input identifying a first location (e.g., a virtual path, as variously described above) for the first portion of the data in the index of the virtual index server. The first portion of data may comprise a first plurality of files and folders, and the first destination location in the virtual index of the first plurality of files and folders. In other words, the third user input may specify a first location in the virtual index that indicates the first portion of data.

At 1208, the first computer system may receive fourth user input specifying a second storage provider for the virtual index of the virtual index server. The second storage provider may be a separate storage provider from the first storage provider, which may be commonly or separately owned (and/or collocated or separately located) from the first storage provider.

At 1210, the first computer system may receive fifth user input identifying a second portion of data stored by the second storage provider for inclusion in the virtual index of the virtual index server. The second portion of data may be of any of the various types described above in reference to step 1204.

At 1212, the first computer system may receive sixth user input identifying a second location for the second portion of the data in the virtual index of the virtual index server. The second portion of data may comprise a second plurality of files and folders, and the second location of the index may indicate the second plurality of files and folders. The first location and the second location may be entirely separate locations within the virtual index, or they may partially or completely overlap within the virtual index. For embodiments where the first and second locations partially or completely overlap, a grafting/merging process may be undergone, as described in greater detail above in reference to FIG. 4.

At 1214, the first computer system may construct the virtual index of the virtual index server, wherein the virtual index refers to the first portion of data at the first location, and wherein the virtual index refers to the second portion of data at the second location. For example, the first portion of data may comprise a first plurality of folders and/or files, and the second portion of data may comprise a second plurality of folders and/or files. The first location and the second location in the index may refer to a same location (e.g., a single directory), and the location may indicate (e.g., may map to, point toward, or otherwise indicate) the first plurality of folder and/or files and/or the second plurality of folders and/or files.

In some embodiments, metadata associated with the first and second portions of data included in the virtual index may be normalized to a common format. For example, in constructing the virtual index, the first computer system may identify first metadata of the first portion of data and second metadata of the second portion of data. The computer system may convert the first metadata and the second metadata into a normalized metadata format to create first normalized metadata and second normalized metadata, and may subsequently store the first normalized metadata and the second normalized metadata in the virtual index. In some embodiments, the first normalized metadata may be stored at the first location, and the second normalized metadata may be stored at the second location.

At 1216, the first computer system may receive a first request from a second computer system to access the first location of the virtual index. The second computer system may be a content delivery network (CDN), a personal computer, or another type of computing device.

At 1218, in response to the first request, the first computer system may retrieve the first portion of data. In some embodiments, the first computer system may check whether the first portion of data is cached locally at the first computer system. If the first portion of data is cached locally, the computer system may retrieve the first portion of data from the cache. If the first portion of data is not cached locally, the computer system may retrieve the first portion of data from the first storage provider. In some embodiments, the first computer system may store the first portion of data in its local cache after retrieving it from the first storage provider.

Retrieving the first portion of data from the first storage provider may involve using first authentication information. For example, in some embodiments, in response to seventh user input authorizing access to the first storage provider, the first computer system may receive first authentication information usable to access the first portion of data at the first storage provider. In some embodiments, the seventh user input may be provided to the first storage provider to authorize the first computer system to access the first portion of data at the first storage provider. As one example, the first storage provider may transmit the first authentication information to the first computer system in response to the seventh user input. Similarly, in response to eighth user input authorizing access to the second storage provider, the first computer system may receive second authentication information usable to access the second portion of data at the second storage provider. In some embodiments, the eighth user input may be provided to the second storage provider.

At 1220, in further response to the first request, the first computer system may provide the first portion of data to the second computer system. The first portion of data may be provided from the local cache of the first computer system, or it may be provided after retrieving it from the first storage provider.

In some embodiments, the methods described in FIGS. 12*a*-12*b* may be extended to include portions of data from additional storage providers, and/or to receive requests from additional computer systems to access portions of data indexed by the virtual index server. For example, the first computer system may receive a second request from a third computer system to access the second location of the virtual index. In response to the second request, the first computer system may retrieve the second portion of data. In further response to the second request, the first computer system may provide the second portion of data to the third computer system.

Automatic Updates

In some embodiments, the virtual index server may automatically identify modifications, additions, and/or deletions that occur on storage providers with indexed portions of data, and may automatically revise and update the corresponding virtual index. This process may become significantly more complicated as the amount of storage increases, the rate of changes increase, or the number of contributors and contributions go up. Embodiments herein present streamlined and automated methods for updating the index, which may significantly reduce the latency and effort required to manually update a similar index.

As one example, a user may take a photo with a camera and uploaded it to the user's cloud-based photo storage account (e.g., Google Photos or another service). According to embodiments herein, the virtual index server may automatically detect the change, and may automatically add the photo to the corresponding virtual index so that it appears at, for example, http://domain/photos/newpic.jpg. The user experience may be significantly improved by maintaining a web server (i.e., the virtual index server) with contents retrieved from diverse services that may be dynamically updated, managed, and/or collaborated on.

Figure 13:
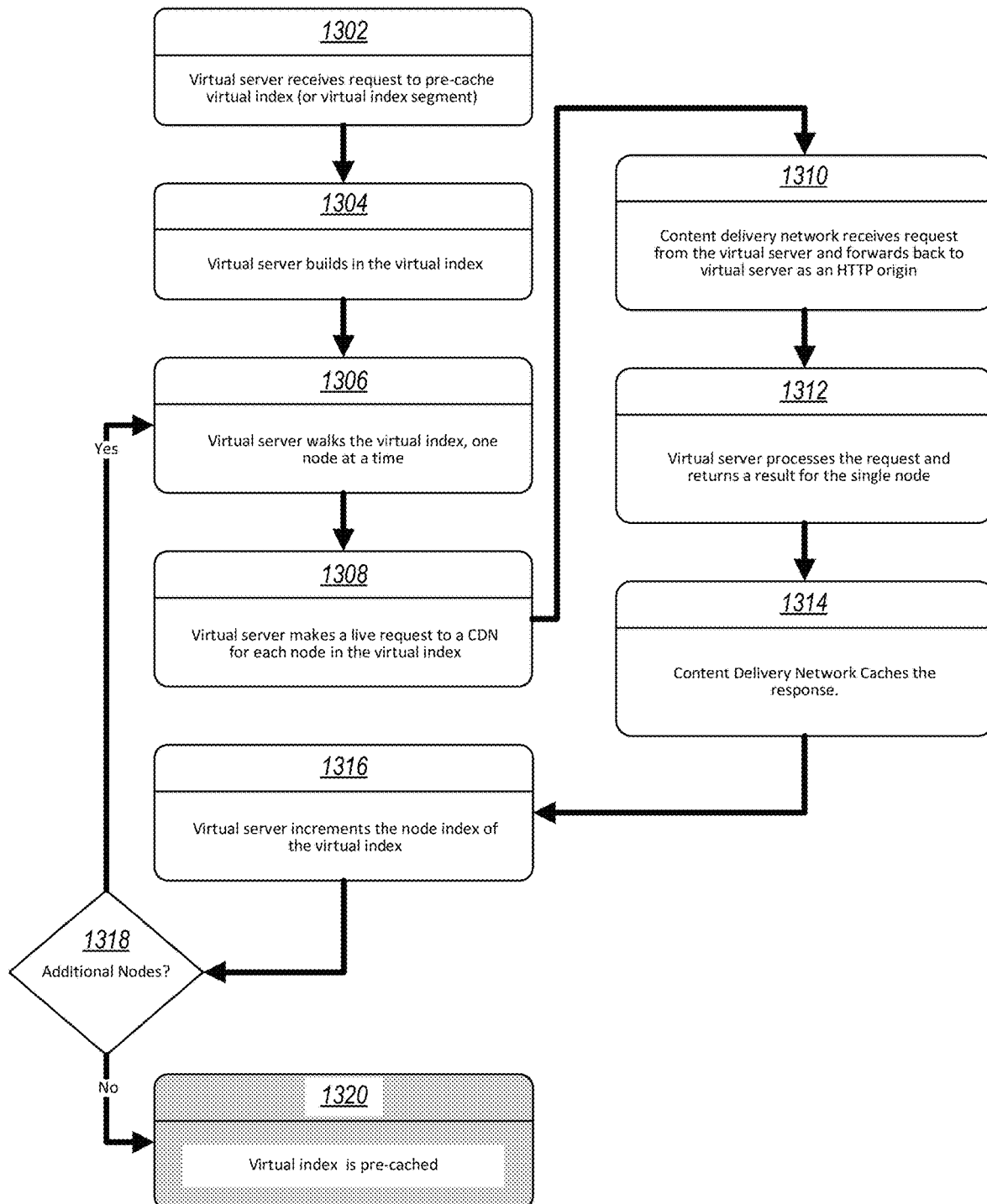
FIG. 13 is a flowchart diagram illustrating a method for pre-caching data on a content distribution network by a virtual index server, according to some embodiments.

FIG. 13—Process to Pre-Cache Data from a Virtual Index Server to a Content Delivery Network FIG. 13 is a flow-chart diagram illustrating a method for pre-caching data from a virtual index server to a content delivery network (CDN). In current implementations, a CDN may typically cache data to its network after a first request from an end-user is made for an un-cached object. This traditional mechanism of acquiring content is referred to herein as a "pull", as the CDN pulls the content from the origin as it is requested. The pull mechanism may extend the processing time of the request if the requested data is un-cached on the CDN, and therefore must be acquired from a remote location (e.g., introducing latency to communicate the requested data from a distant location). Certain CDN applications may involve frequent content changes, bursts of traffic, or have specific performance tolerances. Traditional CDNs, where the CDN and the HTTP origin are separate, do not automatically pre-cache data, as the CDN is not aware of all the content on the HTTP Origin, how to request it, or what to pre-cache. To exacerbate the issue, many CDNs may make multiple request to the HTTP origin for the same content as independent global caches are populated. According to the method steps described below, data may be pre-cached from a virtual index server onto a CDN, thus improving the user experience. Pre-caching may also have a benefit over traditional methods by validating that the CDN is serving the correct data or portion of data. Since the virtual server may make the data request and receive the response, it may verify that the size and content of the response are correct. This may significantly improve the user experience, as it may no longer be necessary to manually validate that the CDN is serving the correct data. Some of the method elements shown in FIG. 13 may be performed concurrently, in a different order than shown, or may be omitted. Additional method elements may also be performed as desired. As shown, the method may operate as follows.

In some embodiments, prior to pre-caching, the existing cache for a virtual index segment may be flushed. This flush process may be CDN-specific, and may involve some type of API on the CDN that allows the virtual server to indicate a "path", whereby its children/descendants are flushed. The pre-cache process may wait until the pre-cache flush is complete before starting the pre-caching process to ensure cached results are not returned. In some embodiments, CDNs may support soft flushing, which may cause content to be "re-validated" wherein the content is kept in the cache, but revalidated with the virtual index server. This may be desirable because it may enable content flushed from cache for pre-caching to be restored to cache by the virtual index server without having to go back to the storage provider or re-transmit the data to the CDN. In other embodiments, as an alternative to flushing the content and re-caching, the virtual server may also fetch the headers of the content already stored in CDN to determine if it is already correct or not. If the content is not cached on the CDN, this may result in a request back to the virtual server.

At 1302, the virtual index server may receive a request to precache a virtual index or a segment of the virtual index ("index segment"). As described herein, index segments are a part of the complete virtual index of the virtual index server, as shown below in reference to FIG. 17b. Segments may be culled from a full virtual index after the virtual index is rendered through a normal process as described throughout this disclosure. This may include any filtering, normalization, merging, and/or grafting. If only a particular segment is used, the rest of the virtual index may be discarded before the node walking occurs (explained below in reference to step 1306) with the exception of nodes required to form the segment, that is, the immediate parents inline to the virtual server root ("virtual root").

The request may be received in response to a variety of triggers, and the precache process may thereby be initiated. For example, pre-caching may be started at the request of the storage provider, due to an alteration of the contents of a storage provider, or any re-rendering of the virtual index that results in a change from the previous instance.

At 1304, the virtual index or index segment is built or pulled from the cache, as is described above in reference to, inter alia, FIGS. 4 and 5. In the event that only a segment of the index is needed, the rest of the virtual index may be disregarded.

At 1306, each node (element) in the index segment is walked one at a time ("node walking") and processed individually. For example, each of the subsequent steps 1308-1316 may be performed for a single node, before an additional node is processed according to steps 1308-1316.

The "nodes" which are walked may include both files and folders, including all descendants of all children and applicable descendants. Files may be processed directly. Folders may be processed to generate fancy indices, to render index files, or to generate errors and redirects. In the event an index file is rendered for a folder, the node may occur again when the folder itself is walked. Pre-caching may walk both variants even if the result is the same to ensure pre-caching occurs for either variant requested by an end-user.

In some embodiments, nodes that cannot be cached may be skipped. For example, certain types of files that require constant post processing or have been configured for short cache lifetimes may be skipped in the pre-caching process. Pre-cache flushing may still occur for these skipped nodes.

At 1308, the virtual index server may initiate a request from itself to the CDN, as an end-user, for a portion of data associated with the particular node in the virtual index or index segment. This may typically include the host/domain, a GET method, and the URI. In some embodiments, the request may additionally include a header (such as a HTTP header) that indicates special authorization, performs a cache function, avoids logging, and/or another special function. While some embodiments may use GET methods for precaching, other embodiments may include other methods based on implementation needs, such as HEAD, or, in specific cases, POST. In other words, the virtual index server may act as a pseudo-end-user, for the purpose of conducting the precaching process to the CDN.

Each CDN, as with storage providers, may implement its own method of interface, typically through a HTTP-based API. On some storage providers, this API may allow the virtual index server to alternatively make a pre-caching request for a given object to the API instead of to the production interface (for example, the production interface may be the public interface accessible by end-users). Further, this interface may allow for the virtual index server to directly publish content for a given host/domain and path (URI) to the CDN cache.

In some embodiments, requests that occur to a CDN as part of the pre-caching process may occur in log files reported by the CDN to the virtual index server. These entries may be identified by the virtual index server due to the end-user IP address, or other fingerprinting methods such as browser, cookie, special HTTP header, or timestamp combinations, and safely ignored from reporting as actual end-user traffic. These analytics are further discussed below in reference to, inter alia, FIGS. 19-20.

To ensure caches are populated globally, the virtual index server may make an identical precaching request from different geographical locations around the world, as needed for a given application. This process may ensure that CDNs for a given geographical region are precached, not just the geographical region of the virtual index server. This may be accomplished in a number of ways according to various embodiments, such as routing virtual index server requests through a proxy in the appropriate geography, splitting the pre-cache process onto separate servers, providing CDN-specific HTTP headers that indicate which edge cache should fulfil the request, or using DNS to resolve a specific edge server in a region to fulfill the request.

At 1310, the CDN may receive the request from the server and may process it like a normal end user request. The CDN may process the request differently depending on whether the CDN employs soft or hard flushing of its data contents (i.e., depending on whether it is revalidating an existing cache or repopulating a cache, respectively). In the case of hard flushing, the CDN may make a direct request for the content back to the server. In the case of soft flushing, the CDN may make a modified since request back to the server.

At 1312, the virtual index server may process the received request from the CDN as a normal request, as shown above in reference to, inter alia, FIG. 9. The server may service the request from its cache, or from a storage provider. The request may variously include headers, a not-modified response, or the content itself. Processing the request may include normalization, post processing, etc. The response may be sent back to the CDN and may include appropriate cache headers.

At 1314, the CDN may receive the response from the virtual index server and may either revalidate data in its existing cache (e.g., for embodiments wherein a not-modified response is received) or may populate its cache with the content received in the response. The result may be returned to the pre-cache process on the virtual index server. In some embodiments, the server may validate the result, to ensure that it is the correct size and content. Beneficially, the server may validate that the content being served from the CDN is correct and up-to-date. If the validation fails (i.e., if the response is not valid), the process of step 1314 may be repeated until validation is successful.

At 1316, the virtual index server may increment the node and repeat steps 1308-1314 for the subsequent node. The virtual index server may continue the node walking process until all nodes, children/descendants are processed.

At 1318, if there are additional unprocessed nodes, as described above, the method may return to 1306 for the subsequent node. If all nodes of the virtual index or index segment have been processed, the method may continue to 1320.

At 1320, when no additional nodes are left in the node walking process, pre-caching is complete and the CDN is updated with pre-cached data.

In current implementations, precaching on a CDN is typically performed manually. This is primarily because the CDN does not know what content is on the HTTP origin, what format it is in, or how it should be requested. In effect, the CDN "pulls" content as needed based on end user requests. In contrast, the methods described in reference to FIG. 13 automatically "push" content to the CDN ahead of the user request, and maintain the cache-readiness and content correctness of the CDN as the virtual index evolves.

The concept of pushing content to a CDN automatically may improve the user experience. The essential nature of a CDN as a one-way requestor has limited its ability to precache in current implementations. The virtual index server precache process, which creates a request loop from itself, to itself, through the CDN, may circumvent the one-way requestor limitations of CDNs, enable dynamic precaching, and improve the user experience.

Precaching is particularly important when the content publisher creates immediate and sizable demand for the content stored on the HTTP origin by the CDN. Examples of how this may happen include content used in an email that is delivered to a large number of users simultaneously, a software update that affects many existing installations simultaneously, or a web page that's revised to using an alternate set of content stored on an HTTP origin.

Figure 14:
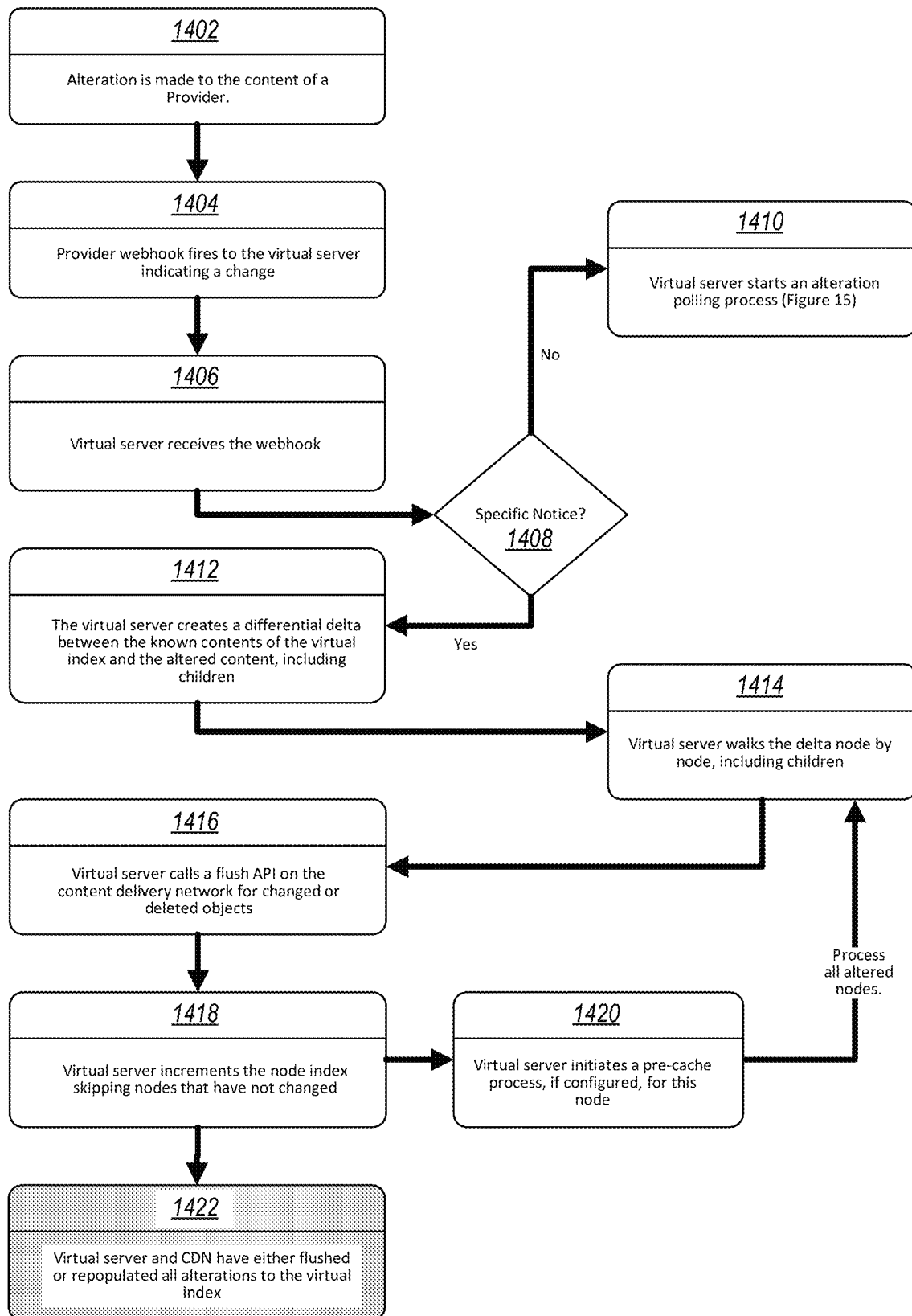
FIG. 14 is a flowchart diagram illustrating a method for automatically updating a virtual index server, according to some embodiments.

FIG. 14—Automatic Updates to a Virtual Server Via Storage Provider Webhooks

FIG. 14 is a flowchart diagram illustrating a method for using storage provider webhooks to perform automatic updates. Storage providers may update their content frequently, regardless of the content delivery mechanism. This content is often maintained, revised, curated, etc. Webhooks are an industry standard callback mechanism that allow a platform (platform A, such as a first content publisher or end-user) to notify another platform (platform B, such as a second content publisher or end-user) of a change or action occurring. In effect, platform B configures platform A with an HTTP URL to deliver a notice to when certain actions occur on platform A. When an applicable change occurs, platform A may make an HTTP request to platform B at the pre-defined URL with relevant notice information, if applicable. FIG. 14 describes a mechanism for utilizing webhooks to refresh the virtual index when changes occur on one or more storage providers. Some of the method elements shown in FIG. 14 may be performed concurrently, in a different order than shown, or may be omitted. Additional method elements may also be performed as desired. As shown, the method may operate as follows.

At 1402, an alteration is made to content stored on a storage provider account paired with a virtual index server. The alteration may be any of an addition, deletion, modification, or relocation of one or more portions of data.

At 1404, the storage provider sends a webhook to the virtual index server indicating the alteration. In other words, the storage provider initiates an HTTP request to the webhook callback URL ("callback") directed to the virtual index server. Storage providers may initiate callbacks for specific user accounts. As such the callback may identify, among other possibilities, the user account (e.g., the content publisher's account) that is relevant. In some embodiments, the callback for the virtual index server is configured for all users of that storage provider (rather than on a user by user basis) such that the same URL is used for all updates of all users. In some embodiments, the scope of the notice defines the specifics of what account and what content is affected.

In some embodiments, the callback may contain callback metadata. For example, in addition to including the user account affected, additional metadata details may include the type of change. For example, the metadata may specify whether the alteration is an addition, deletion, update, or permissions rejection. Some embodiments may employ additional follow-on metadata as implemented by the specific storage provider, and may entail specific details about the alteration such as permissions, metadata name, or a list of specific objects and groups.

In some embodiments, a callback may include a notification regarding contents that are outside the scope of the virtual index server. As one example, if the provider root is "/photos", a callback for changes in "/private" would be out of scope. Additionally, the content of a notification may be in scope, but the type of notice may be irrelevant. For example, a content provider may change the collaboration permissions on an object, which would have no impact on the aspects of the content that is normalized. Out of scope notifications may be dismissed or discarded in full, or to the extent that they are partially out of scope.

In some embodiments, and for some storage providers, multiple scopes may be included in a single callback. Each scope may be processed separately or discarded on its own merits separately.

At 1406, virtual index server (webhook listener) receives the callback from the storage provider. In some embodiments, multiple callbacks may be received from the same storage provider or from multiple storage providers while processing a previous request. The virtual index server may handle parallel requests in multiple ways including, 1) discarding the current request and restarting with an updated virtual index, 2) finishing the existing process, 3) merging future requests together into a single delta and putting them in the queue to process, 4) determining how to proceed by a timing mechanism that would only discard an existing iteration if a certain amount of time had elapsed, 5) merging delta node indexes for comparable virtual paths/index segments only, or 6) a combination of the preceding options.

At 1408, it is determined whether the notice is a specific notice. For example, a specific notice may specifically indicate the nature and location of the alteration, while a non-specific notice may simply state that an alteration has taken place, or may broadly specify which portion(s) of data have been altered. A specific notice, as illustrated in FIG. 14, may determine if an alteration polling process is triggered (or queued) or a particular index segment is identified to be processed. A specific notice may identify exactly what objects or groups are affected, which may be used to determine if the notice is in scope or out of scope. It may also include specific details of the change which can further quantify its scope. If no specific groups or objects are identified in the notice, an alteration polling process for the entire storage provider may be started.

At 1410, if the notice is not specific, the virtual index server may initiate an alteration polling process, as described in detail below in reference to FIG. 15.

At 1412, if the notice is specific, the virtual index server differential is created, as shown below in FIGS. 16-17. The differential may describe the difference between the known contents of the index and the altered contents, including children.

At 1414, the virtual index server traverses the delta node map ("delta node walking") one node at a time, including children. For example, if step 1414 is undertaken after the differential is created at 1412, the virtual index server may traverse the delta node map of the differential. If step 1414 is undertaken after the alteration polling process of step

1412, the virtual index server may traverse the delta node map of the effective result of the alteration polling process.

At 1416, the virtual index server calls the flush API on the CDN for changed or deleted objects, and the next node in the delta node walking process flushes the content from the CDN for that specific node.

At 1418, the delta node index is incremented, and nodes not identified in the delta node map (i.e., the nodes which have not been altered) are skipped or ignored. This traversal may include all children and descendants in the index segment. Each of steps 1414-1418 may be incrementally repeated until all altered nodes are processed.

At 1420, if pre-caching is configured for the server, a pre-cache operation may be initialized (which excludes the flushing which has already been done) as described above in reference to FIG. 13. However, if the alteration was simply the deletion of one or more files or folders, pre-caching may not be required and step 1420 may be skipped. When processing callbacks, content may be flushed on an object-by-object and group-by-group basis (which may include children and descendants), but not for the entire storage provider (unless a non-specific notice is specified or the virtual index server is configured as such). Alternatively, steps 1406-1416 may be used to pre-cache.

At 1422, the virtual index server and the CDN have either flushed or repopulated all alterations to the virtual index. In other words, all nodes in the delta node walking process have been flushed, and, if needed, pre-cached and pre or post-processed. The CDN state will now reflect the current state of the storage provider.

Callbacks may allow for content to be both pre-cached and dynamically updated as alterations occur, which may include updates, additions, and deletions. The alterations may be automatically propagated from a storage provider to a content delivery network in close to real time. By contrast, updates to content stored on a storage provider may follow a comparable process for updates as the original deployment of the HTTP origin. If a single object were updated, it may be exported, placed on an HTTP origin, pre or post-porcessed, and then the CDN may be contacted (potentially through a web-based user interface) and told to flush contents. The next request would fetch the new contents from the HTTP Origin.

Traditional CDN update implementations may be tedious with a single update. In a collaborative environment where many changes are being made, and changes are being made by multiple individuals, it may be very difficult to relay changes to a CDN. In some current implementations, the maintainer (e.g., the content publisher) may export all the content from the storage provider, import it to the HTTP origin, flush the CDN, and wait for updates based at regular intervals (e.g., once a day or another interval). However, if a content publisher performs these steps, they may lose benefits of per-node/per object flushing and pre-caching. For example, they may typically flush entire zones or CDN configurations. The process described in reference to FIG. 14, combined with the construction and use of a virtual index server, may be extremely efficient compared with industry norms.

Figure 15:
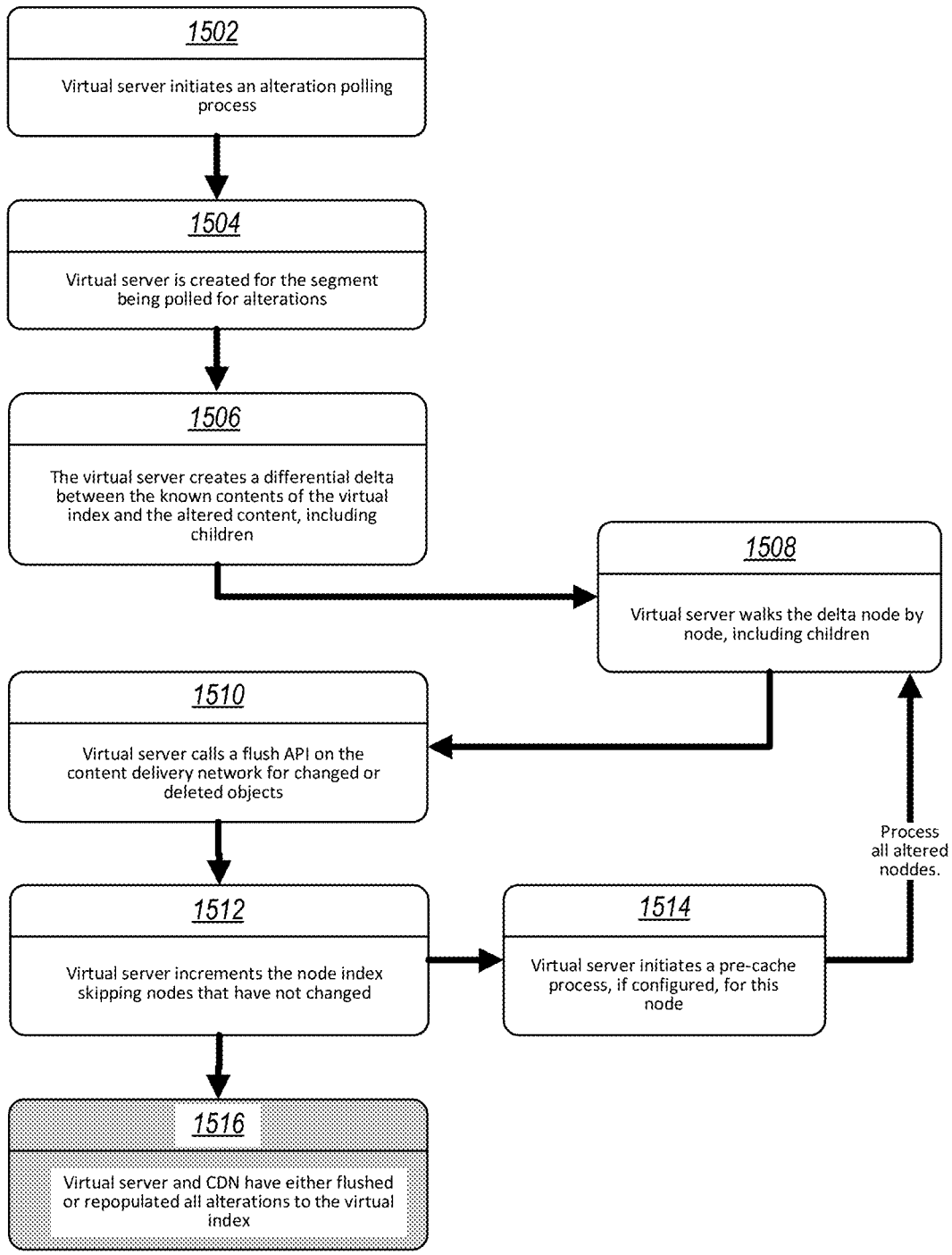
FIG. 15 is a flowchart diagram illustrating a method for performing an alteration polling process for automatic updates, according to some embodiments.

FIG. 15—Automatic Updates to a Virtual Index Server Via Storage Provider Alteration Polling Process FIG. 15 is a flowchart diagram illustrating a method for using an alteration polling process to perform automatic updates. As described above in reference to FIG. 14, in some embodiments changes in a storage provider may be processed after the initial virtual index is created through webhook callbacks. In embodiments where a non-specific notice is received, an alteration polling process (or "polling process") may be used to build a full or partial virtual index or index segment which can be utilized in a similar process to FIG. 14, steps 1412 through 1420. The polling process may be used to check for available data, updated information, or a change in state. In some embodiments, the polling process is used to build a new virtual index, compare it with the virtual index as it is known to the virtual server, and construct an index differential if any exists. The delta may then be processed to modify, flush, or add content to the CDN and the virtual index server. The alteration polling process is described in detail here in reference to FIG. 15. Some of the method elements shown in FIG. 15 may be performed concurrently, in a different order than shown, or may be omitted. Additional method elements may also be performed as desired. As shown, the method may operate as follows.

At 1502, an alteration polling process is initiated by a virtual index server. For example, the alteration polling process may be initiated in response to the virtual index server receiving a non-specific notice of an alteration in a callback received from a storage provider. Alternatively, in some embodiments the alteration polling process may be initiated because the storage provider does not support webhook callbacks, as time-based periodic polling, as demand-based periodic polling, as a flush of the virtual index server cache, as a result of a non-specific webhook callback, which results in the virtual index server knowing something may have changed but having no idea what it was specifically. Alternatively, an alteration polling process may begin because of a content publisher manually initiated request.

At 1504, a new index segment is created for the segment of the virtual index that is indicated as altered by the callback. In some embodiments, the indicated segment may not exist at all in the current index (i.e. if the alteration is an addition), in which case the most relevant parent may be referenced, up to and including the virtual root. The segment may comprise the entire virtual index, in some embodiments. In other words, a segment of the index is created corresponding to the graft point of the relative provider root of the storage provider that sent the callback, and further corresponding to the path or index segment that is being polled for alterations. This may follow the process described above in reference to FIGS. 3 and 4.

In some embodiments, an existing virtual index may be missing or previously flushed, and it may be treated as an empty virtual index with the only node being the virtualized root. As such, all entries from the polling process may be considered new or updated. This process may first require that any remnant cache on the CDN is flushed in its entirety, as the virtual server may no longer know what was previously located in the cache. This process may then resemble the building of an initial virtual index as described in FIGS. 4 and 5, as well as performing the pre-caching and flushing process described in FIG. 13.

At 1506, a delta node index is created between the contents of the known index segment and the index segment created at step 1504. The delta node index may include children. Note that the output of step 1506 comprises the effective result of the alteration polling process discussed above in reference to step 1410 of FIG. 14. The following steps 1508-1516 are equivalent to the comparable steps 1414-1422 of FIG. 14. In some embodiments, a callback that is not specific may perform a polling process to create a delta of alterations. Once the delta is created, the process of flushing, processing, and pre-caching data may be the same between polling and webhooks. As such, the process between FIG. 14 and FIG. 15 may be somewhat duplicated.

In some embodiments, the polling process may return no changes once the delta is created. If the polling process index or index segment matches what is already known to the virtual index server for a given virtual index or index segment, no further action may be taken and the subsequent steps below may be omitted.

At 1508, the virtualized server traverses the delta node map ("delta node walking") one node at a time. Delta node walking may proceed similarly to as is described above, e.g., in reference to, inter alia, FIG. 14.

At 1510, the next node in the delta node walking process flushes the content from the CDN for that specific node. For example, the virtual index server may call the flush API on the CDN for changed or deleted objects. If the CDN was flushed in its entirety, this step may be skipped.

At 1512, the delta node index is incremented, and nodes not identified in the differential are skipped or ignored. This traversal may include all children and descendants in the index segment. The process of steps 1510-1512 may be repeated for each node until all nodes are processed.

At 1514, if pre-caching is configured for the server, a pre-cache operation may be initialized (which excludes the flushing which has already been done) as described above in reference to FIG. 14.

At 1516, once all nodes in the delta node walking process have been flushed, and, if needed, pre-cached, the CDN state may now reflect the current state of the virtual index. In other words, after the virtual index server and the CDN have either flushed or repopulated all alterations to the virtual index, the virtual index server and the CDN is up to date.

The alteration polling process may be viewed as a subset or a replacement for the webhook callback process. They share the same benefits and similar processes. The primary difference between these two processes is that the webhook callback process may be initiated by the storage provider, and the alteration polling process may be initiated by the virtual index server. Additionally, the two processes may differ in performance and load. As one example, if there are 1000 objects and 100 groups located on a storage provider, it may be much faster for the storage provider to inform the virtual index server of what has changed (e.g., many of the objects and groups may not have changed), rather than rebuilding the entire 1000 object virtual index and comparing the result to the original virtual index. In both cases, the updates may be picked up. The webhook callback may provide a closer to real-time response than the alteration polling process. Overall, FIG. 14 and FIG. 15 are two variants of a similar process, with the same end result of an updated index and CDN.

Figure 16A:
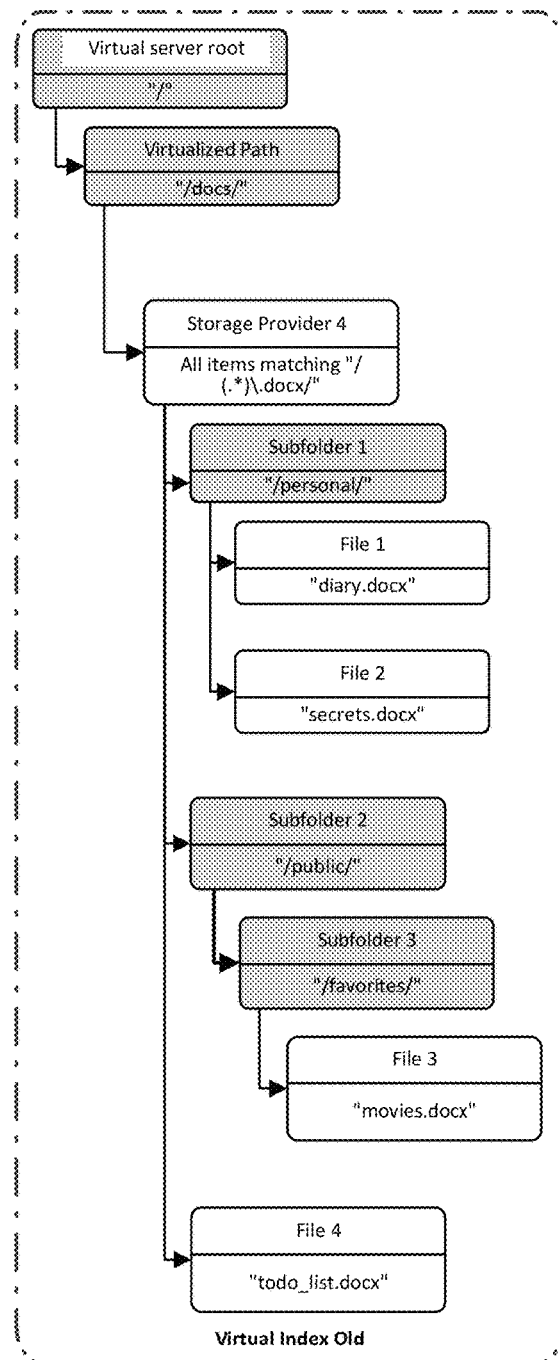
FIGS. 16a-16b illustrate a comparison between an example old index and new index, according to some embodiments.
Figure 16B:
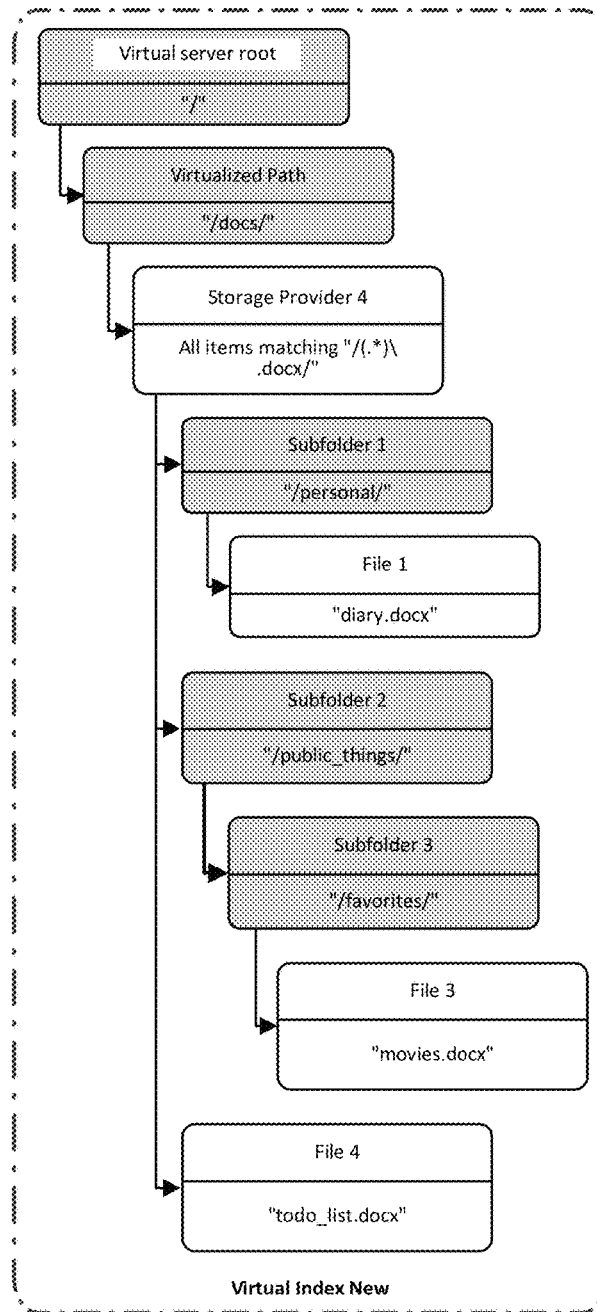
Figure 17A:
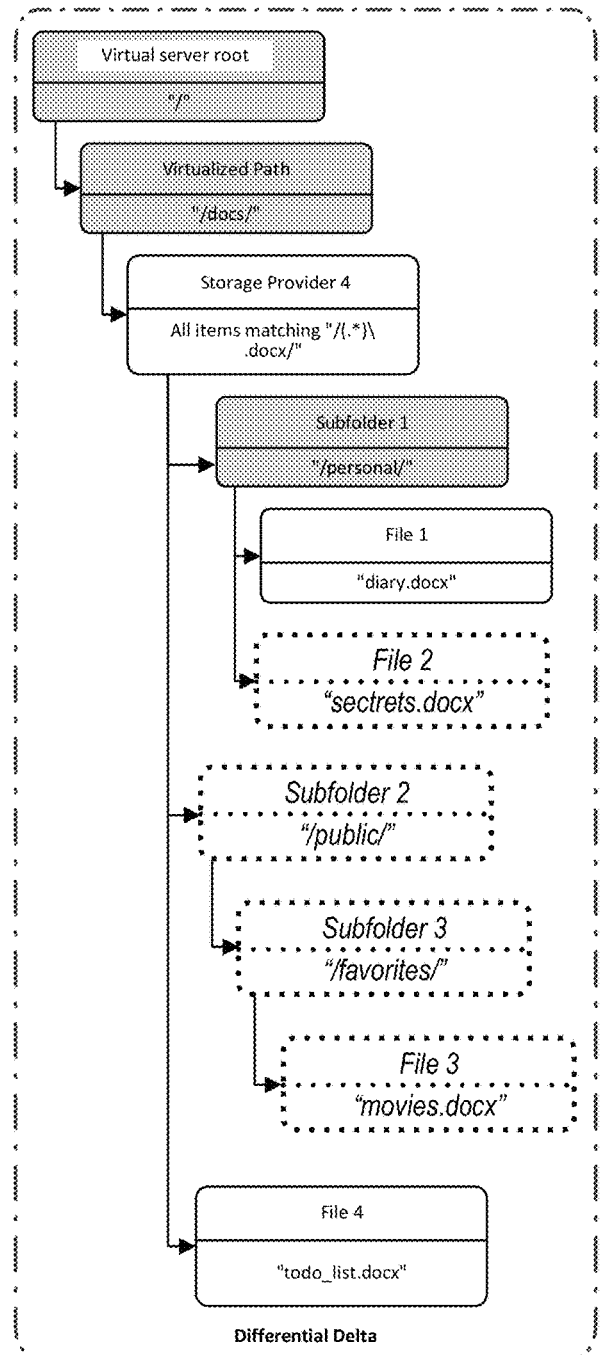
FIGS. 17a-17b illustrate an index differential calculation, according to some embodiments.
Figure 17B:
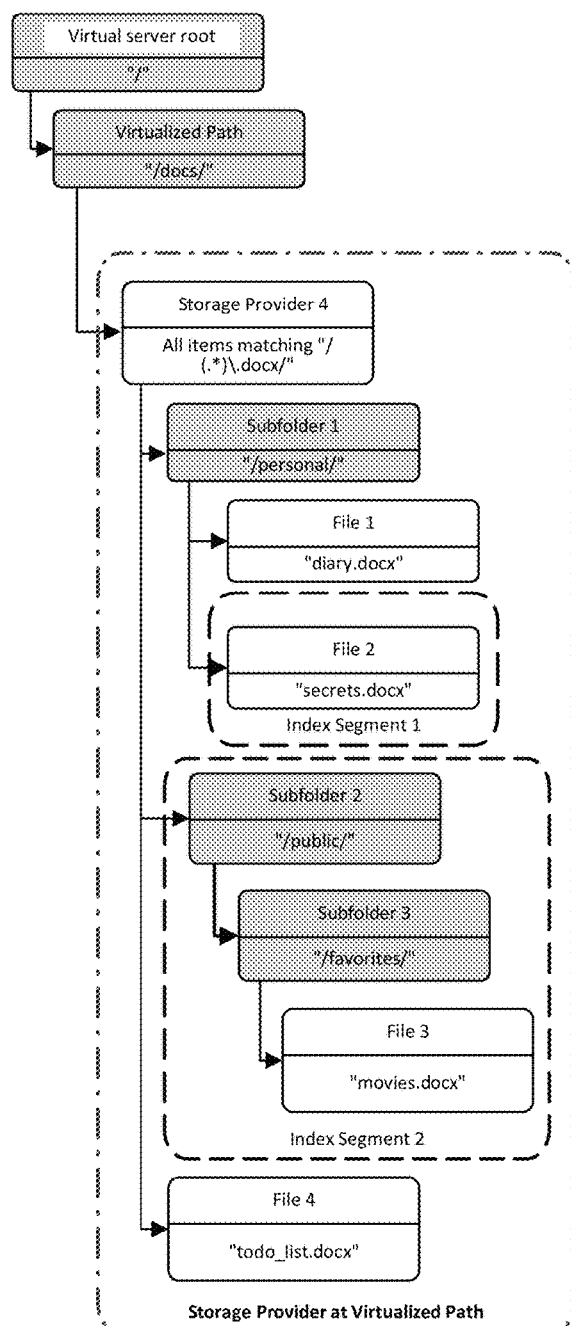

FIGS. 16-17: Description of how Differential Datasets of Virtual Indexes are Identified FIGS. 16a-16b illustrate a comparison between an original virtual index (FIG. 16a, the "old index") and an updated virtual index (FIG. 16b, "new index") of the same virtual index server. As illustrated, the new index includes the removal of File 2, "secrets.docx" within the Subfolder 1 of the index. Additionally, the new index renames Subfolder 2 from "/public/" to "public_things/". FIG. 17a shows the result of a delta created from the old index (FIG. 16a) and the new Index (FIG. 16b). The delta nodes in the index are identified with a dotted outline. FIG. 17b shows how index segments are visualized, as "index segment 1", and "index segment 2" within the dashed outlines.

FIGS. 16-17 illustrate how differentials (deltas) in virtual indexes are identified and processed. According to various embodiments, this process may be used for various functionalities in the system, including automatic updates and recreation of virtual indexes. As illustrated, any node that is changed is identified in the delta. Any child or descendant of a changed node is also identified as changed. These examples, together, show several types of changes that can affect content. Each of these changes are broken down in detail below. For continuity, these examples continue the example previously show in FIG. 4.

As illustrated, storage provider 4 is grafted onto the virtual server root at the virtual path "/docs/". Subfolder 1 did not change. However, its child, File 2 was removed in the updated new index. Subfolder 2 was renamed from "/public" to "/public_things". Subfolder 3 and File 3 were unchanged, and File 4 was unchanged.

The delta, shown in FIG. 17a, identities 4 nodes from the original index that have changed. These are represented as two index segments in FIG. 17b. The three-node segment identified in FIGS. 17a-17b has three nodes because the subfolder 2 was renamed. The virtual index may not identify that the subfolder is renamed, so it is may assume that subfolder 2 was removed and a new subfolder named "/public_things" was added. As such, by practice, when a folder node is changed, all children and descendants may be assumed to be different and included in the delta segment as a change.

This is practically relevant because an HTTP URI that points to "/public/favorites/movies.docx" would no longer work after the change. The path would be invalid, even if the movies.docx were unchanged. Index segments, as shown in FIG. 17b, may be used for processing automatic updates and in pre-caching and flushing.

Figure 18:
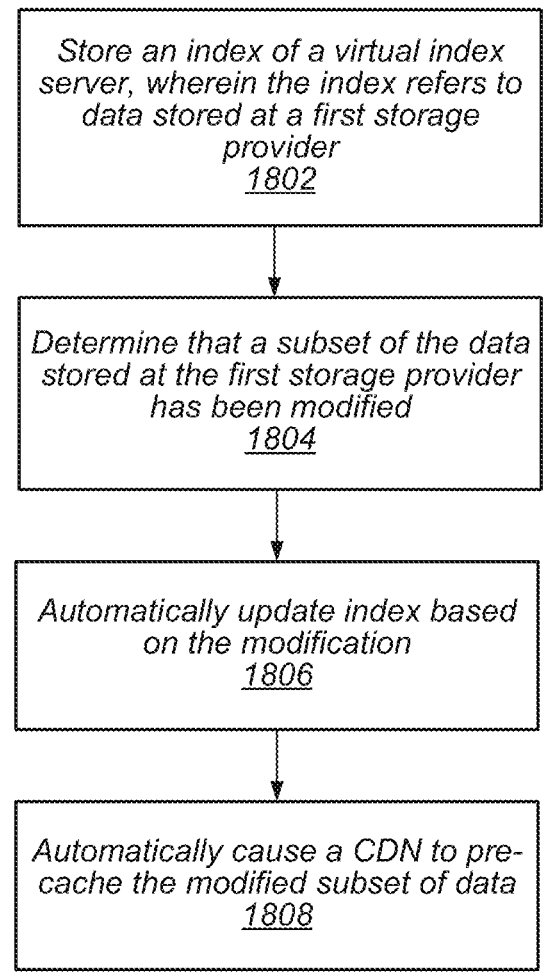
FIG. 18 is a flowchart diagram illustrating a method for performing automatic updates of a virtual index server, according to some embodiments.

FIG. 18—Automatic Updates to Virtual Index Server

FIG. 18 is a flowchart diagram illustrating a method for performing automatic updates of a virtual index server, according to some embodiments. According to various embodiments, and as described in greater detail above, automatic updates may involve one or both of pre-caching of altered data or flushing of existing cached data on a CDN. Some of the method elements shown may be performed concurrently, in a different order than shown, or may be omitted. Additional method elements may also be performed as desired. As shown, the method may operate as follows.

At 1802, a computer system may store a virtual index of a virtual index server, wherein the virtual index refers to data stored at a first storage provider, and wherein the first storage provider is different than the computer system.

At 1804, the computer system may determine that a subset of the data stored at the first storage provider has been modified. For example, the computer system may determine that the subset of the data stored at the first storage provider has been modified by receiving an indication of the modification from the first storage provider. The indication may be a specific notice or a non-specific notice, in various embodiments. In some embodiments, the computer system may determine a new portion of the virtual index based at least in part on an indication received from the first storage provider, and may determine that a subset of the data stored at the first storage provider has been modified by determining at least one difference between the new portion of the virtual index and a respective portion of virtual the index. Various methodologies for determining at least one difference between the new portion of the index and a respective portion of the index are described in further detail above, in reference to FIGS. 14 and 15.

At 1806, the computer system may automatically update the virtual index based on the modification. For example, the computer system may create a new portion of the virtual index based on the modified subset of the data, and may automatically update the virtual index based on the modification by replacing a respective portion of the virtual index with the new portion of the virtual index. In some embodiments, determining that the subset of data has been modified at step 1804 may be accomplished by determining at least one difference between the new portion of the index and the respective portion of the index.

At 1808, the computer system may automatically cause a content delivery network (CDN) to pre-cache the modified subset of the data. For example, the computer system may transmit a first request to the CDN to flush the subset of the data, and may transmit a second request to the CDN to pre-cache the modified subset of the data. In other embodiments, the computer system may automatically cause the CDN to pre-cache the modified subset of the data by transmitting a first one or more requests for the subset of the data from the CDN. In response to the first one or more requests, the computer system may receive a corresponding second one or more requests from the CDN for the subset of the data. The computer system may retrieve the modified subset of the data from the first storage provider and provide the modified subset of the data to the CDN in response to the second one or more requests.

In some embodiments, determining that the subset of data stored at the first storage provider has been modified may comprise determining that a file or folder has been added to or removed from the subset of the data, or modified. In these embodiments, said automatically causing the CDN to pre-cache or flush the modified subset of the data may comprise automatically causing the CDN to pre-cache or flush the added file or folder, remove the file or folder, or modify the file or folder, respectively.

Analytics Reporting

As understood herein, analytics reporting refers to the ability to connect traditional transfer logs from a web server or CDN to a modern analytics provider by normalizing the data in the transfer logs, and playing the transfers back to the API of an analytics provider. For example, a user may view an image hosted on a CDN that has a link associated with it. The publisher of the image may use an analytics provider (such as Google Analytics or another analytics provider) to see the activity. If a user clicks the image and it loads a web page, the publisher may see who loaded the web page in the analytics provider. If the publisher want to see all users who viewed the image, regardless of if they clicked it or not, that data may not be available in the analytics provider. Using analytics reporting, the logs from the CDN may be normalized, and sent to the analytics provider. The publisher may then see all the views of the image, as well the users who loaded the destination webpage. This may be a valuable piece of data for the publisher, as it allows him to see a full conversation rate and underlying trends that may affect click through, such as geo, language, browser, etc.

Figure 19:
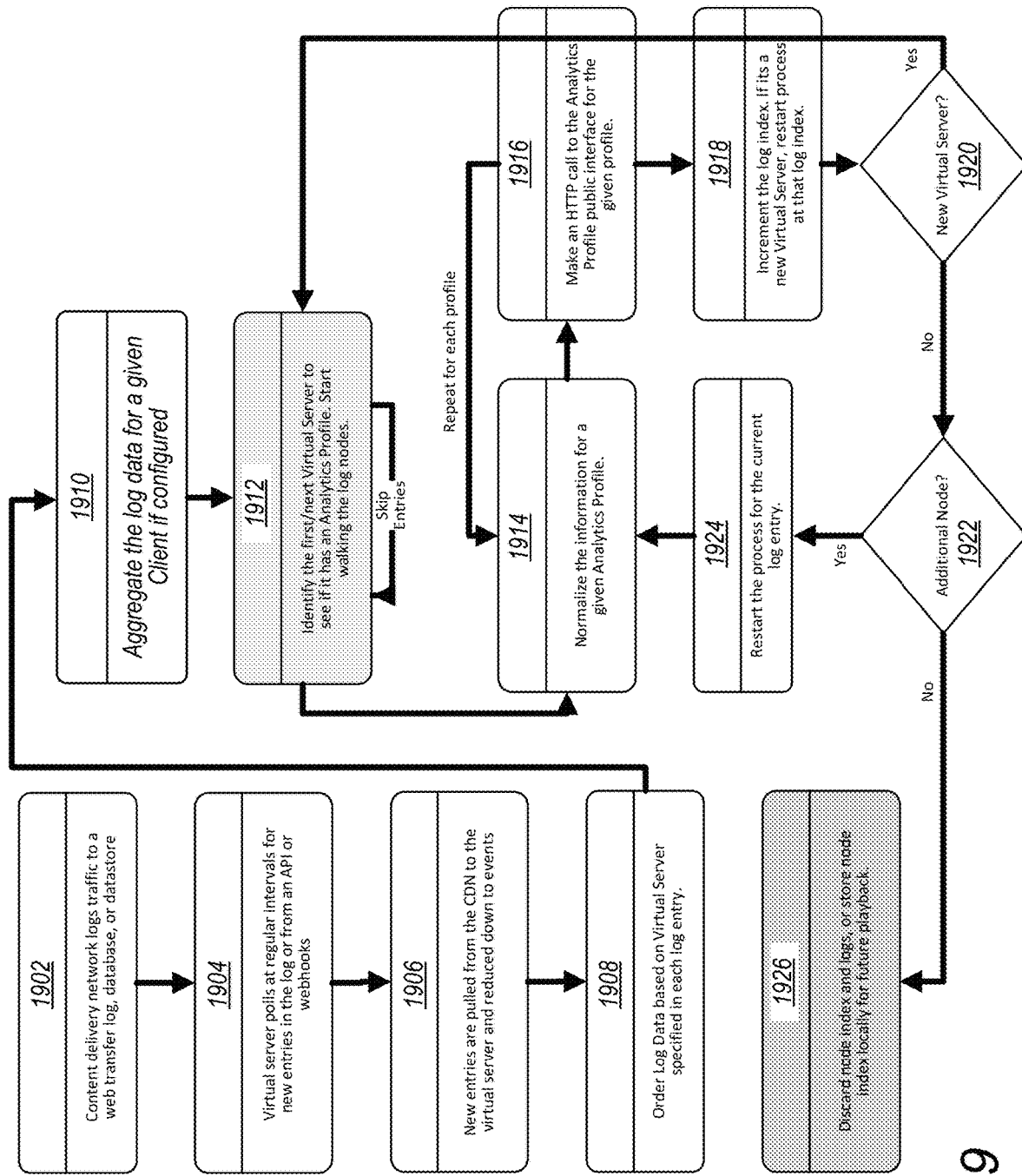
FIG. 19 is a flowchart diagram illustrating a detailed method for performing enhanced data analytics using a virtual index server, according to some embodiments.

FIG. 19—Processing and Transmitting CDN Log Data to an Internet Analytics Provider FIG. 19 is a flowchart diagram illustrating a method for processing and transmitting CDN log data to an analytics provider, according to some embodiments. CDNs may be described effectively as networks of HTTP Servers. As such, they may produce transfer logs relevant to a given account on the CDN. These transfer logs may be used internally for billing and analysis, but may also be made available, in part or in full, to customers so that the customers can further analyze traffic trends. In existing implementations a variety of tools exist to analyze these standardized log formats, but the tools may be fragmented, limited, and/or only work on limited sets of data of limited periods of time.

To acquire more detailed information on user activity, web analytics providers have become popular and prevalent. These providers, like storage providers, may be built for a specific purpose, and may not be compatible with each other. Many of them operate by placing code onto a webpage, which may include JavaScript, an image tag, or a code in the underlying server. The usage logs collected by an analytics provider may be stored and aggregated in an interim location and played back at a later point. These analytics providers may allow users to do advanced visualizations of how users are interacting with their websites, mobile products, and software applications. However, the user experience may be significantly improved if log files from multiple sources were normalized into a common format and relayed to analytics process.

Because of the nature of CDNs as distributed networks of servers, logs may be aggregated by the CDN from all relevant edges, and may be available at a point after the data has been compiled. FIG. 19 may be initiated after requests to the CDN have already been serviced, and logs are aggregated. Some of the method elements shown in FIG. 19 may be performed concurrently, in a different order than shown, or may be omitted. Additional method elements may also be performed as desired. As shown, the method may operate as follows.

At 1902, serviced HTTP requests to the CDN are aggregated into a log file by the CDN, physical or database driven. In other words, the CDN may log traffic to a web transfer log or a database. The CDN may log error states in the logs as well, i.e. requests that could not be serviced for one reason or another. These errors may be included in the analytics provider reporting, aggregated, disregarded, or only reported once a threshold is passed.

The log results may be aggregated for reporting purposes to limit the amount of events reported to an analytics provider. As one example, if a client did 10 partial requests for an object over a 30 minute period, it may be advantageous for a content publisher to report a single event for that user, instead of 10 events. In these embodiments, the virtual index server may add up the size of all the responses to a given URL, the number of responses, and bundle those into a single event for reporting.

In some embodiments, aggregation may have a time window associated with it, so that the reporting method knows how wide of a time span to aggregate data. A common aggregation may be on an hourly or daily basis (or another time period) such that unique events occur in a given window and the signal to noise ratio of trackable events is increased.

In some embodiments, the CDN implements an API to pull log data instead of making it available in a static file. In these embodiments, the client may make an API request for a given time frame and the results may be returned in an applicable format, which may include a standard log format, a custom JSON response, or some other compatible format. Regardless of the formatting of the response, the IP address of the client, the host/domain, the HTTP response code, the HTTP request URI, the time of the request, and the size of the response may be included in the response.

There are a variety of formats available for CDN logs. According to various embodiments, the log format used may be a World Wide Web Consortium ("W3C") format, W3C Extended format, or a variant thereof. Many logs contain basic information such as the IP address of the client, the host/domain requested, the request URI, the method, the HTTP response code, the time of the request, and the size of the response. There are a variety of other fields which may be included as well, including the IP address of the server, the query string, the browser or user agent, any client cookies sent, and server cookies sent to the client, client geographic information, language information, ISP information, the total size of the content, forward HTTP origin details (which may include IP, host/domain, modified URI, etc), cache status, zone or region served from, request trace information, etc. For partial content requests, the range request details of the request may be logged.

At 1904, the virtual index server polls the CDN for log updates at regular intervals to the log destination, the log origin, or to a log API. According to various embodiments, logs from a CDN may be polled or delivered to a predefined location by the CDN, or both. For log delivery, when a log set is available, the CDN may upload the logs to a pre-specified secure FTP location. The virtual index server could than check that same Secure file transfer protocol (FTP) location for new log files to process. Log delivery may also occur when a CDN delivers logs to a service controlled or hosted by the CDN, such as Amazon CloudFront delivery logs to Amazon S3. Logs may be delivered over a variety of protocols, including HTTP, FTP, and secure shell FTP (SFTP). It may be possible to accept log delivery directly to the virtual index server itself if the CDN supports HTTP log delivery (not illustrated in FIG. 19). Alternatively, logs may need to be polled at regular intervals by the virtual index server. In the case of an API log delivery, the virtual index server may make periodic requests to the CDN API to see if new logs are available. This may also involve the virtual index server keeping track of the last successful log to ensure it only pulls new log data during the polling process. In some embodiments, a CDN may allow a webhook callback to the virtual index server when new logs are available, thereby eliminating the need for polling.

In some embodiments, logs may be processed in parallel from a CDN so that data may only be reported in a single log entry from the CDN. The virtual index server may also be paired with multiple CDNs. Delays for aggregation may still effect similar CDNs even with parallel processing.

In some embodiments, the CDN's log data may become delayed and out of order. In these embodiments, the virtual index server may delay the analytics reporting process for a predetermined period of time (e.g., several hours or another period of time) if aggregation is applied, to ensure the data is aggregated properly.

At 1906, new log entries (e.g., new log files), are requested or downloaded from the log destination, the log origin, or the log API. The new entries may be pulled from the CDN and reduced down to events.

At 1908, log data is ordered by host/domain, and then by the IP address or another identifier of the client. In other embodiments, this ordering may be done in other combinations as is desirable for the particular implementation. For example, ordering may be performed by IP address of the client first, so all requests from a given IP are aggregated. Another example would be to aggregate by URI so that all content may be aggregated to report total bytes for that URI during a given timeframe/period. In some embodiments, aggregation may not exceed the scope of a virtual index server configured host/domain, as configured in FIG. 3.

At 1910, the data may be optionally aggregated using the pre-defined aggregation scheme, if aggregation is configured for the particular client.

At 1912, a virtual index server in the log is identified by the host/domain combination. Log entries that do not have an associated virtual index server or entries that do have a virtual index server but no analytics profile specified may be skipped. For example, some virtual index server configurations may have no analytics profile specified, as a user may not want to report to any analytics provider. In this case, the log entries may be skipped for the purpose of reporting to an analytics provider. The entries may still be recorded for later playback to an analytics provider and for accounting purposes, on the virtual index server itself. Skipping log entries may repeat the virtual index server selection once a different host/domain combination is found. The skipping process may then repeat again. The log nodes of the identified virtual index server may then be walked.

In the event no analytics provider is configured at the time log entries are received, and later, a content publisher configures an analytics provider, in some embodiments the historically recorded log entries may be replayed to a newly configured analytics provider. This may be accomplished by recording the log entries to the virtual index server even if they were not played back to an analytics provider at the time of initial processing. Alternatively, if a user changes from one analytics provider to another, for example, from Google Analytics to Mixpanel, it is similarly possibly to replay the data previously sent to Google Analytics to Mixpanel for the purposes of parity.

At 1914, the entries from the log file are normalized into a common set of fields. The process of normalizing logs may enable log entries created by different CDN's in different formats to be transmitted to different analytics providers, each with their own common fields. Not all fields may be applicable for all CDNs or all analytics providers. Missing fields in a log may be set to null and omitted, and analytics providers not supporting a normalized field may simply skip that field when constructing the report.

Table 2 below illustrates several exemplary normalized properties that may be used to normalize log files. Each of the following properties, among others, may be used or omitted according to various embodiments.

TABLE 2

Normalized properties for log files

| Normalized Value | Log File Mapping |
|---|---|
| Server | The virtual index server name or ID. |
| Custom String | A custom string statically configured by the Content Publisher on the virtual index server for descriptive purposes. |
| URL | The full URL of the request. |
| Timestamp | Date and time of the request to the CDN. |
| Client IP | The IP address of the requesting client. |
| Browser/User Agent | The clients browser or user agent string, or null if not available. |
| Object Size | The original size of the object. |
| Transmit Size | The size of the response as calculated by thh CDN. |
| ISO Geo Code | The country the request originated from. |
| Result | Successful or Errored HTTP result. |
| Aggregated Transfers | The number of aggregated transfers the event is comprised of. |

The "Server" value may be the name of the server as configured in FIG. 3 to allow users to identify and filter on a particular configuration. The "Custom String" may be a small note a content publisher may tag a virtual index server with to help it filter and manage traffic reports on the analytics provider. It may be configured on the virtual index server by the content publisher and may be specific to a virtual path. The timestamp may be normalized to match the input expected by the analytics provider. All other fields are common fields that may in whole or in part be used by many analytics providers. Fields that are not supported by an analytics provider may be reported through custom fields if supported. Normalization is described in greater detail above, e.g., in reference to FIG. 6.

At 1916, the normalized result is encapsulated in a format compatible with the analytics provider and delivered over HTTP. In other words, the virtual index server may make an HTTP call to the public interface of the analytics provider, to deliver the normalized entries. For example, analytics providers may not accept raw log files, so that the normalized log files may be translated into an HTTP request before being sent to the analytics provider. Additional providers may be processed before proceeding. For example, the log data may be ordered based on the associated virtual index server specified in each log entry. The virtual index server may have more than one analytics configuration paired with it. For example, a content publisher may want to report to both Mixpanel and Google Analytics. In the event that more than one profile are configured, each normalized entry created in step 1914 and reported in step 1916 may be re-reported to additional analytics providers before proceeding to step 1918.

While FIG. 19 shows the process on a per entry/node basis, in some embodiments an analytics provider may support bulk reporting, where many events may be reported at once. In these embodiments, step 1916 may be skipped while entries are queued until a threshold is passed. After a threshold is passed, all entries for that analytics provider may be reported in a single iteration of step 1916.

At 1918, the log index is incremented.

At 1920, it may be determined whether the next log index node is a different virtual index server from the previous node. If a new host/domain is found, the method may return to step 1912, look up the new virtual index server and analytics provider, process or skip, and continue. If there is not a new virtual index server, the method may continue to step 1922.

At 1922, it may be determined whether there are additional nodes to be processed. If there are additional nodes, the method may continue to step 1924. If there are not additional nodes, the method may continue to step 1926.

At 1924, if the next log entry in step 1918 was the same host/domain, the reporting process may be restarted for that log entry at step 1914.

At 1926, if there are no additional log entries after step 1922, the process is complete. The raw log entries (the full set of logs) can be stored for future playback.

Figure 20:
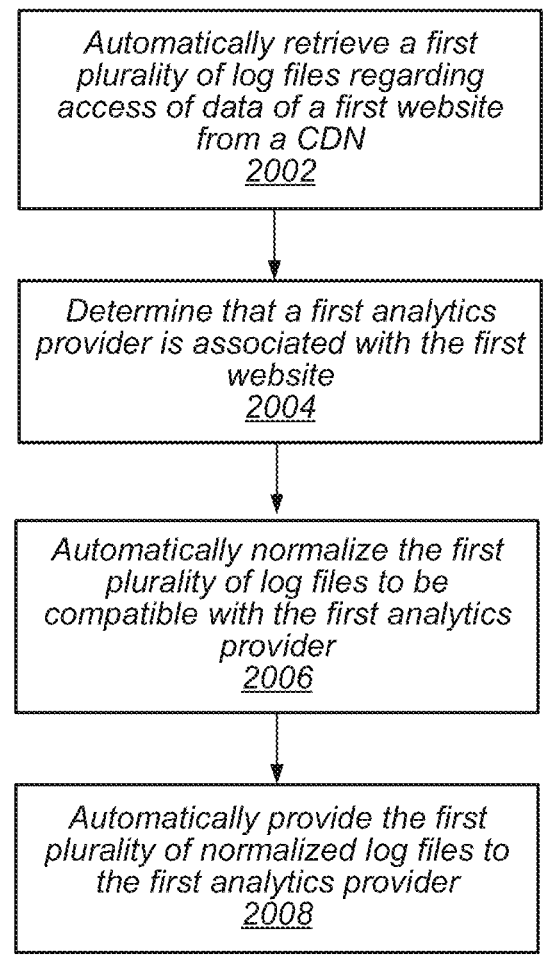
FIG. 20 is a flowchart diagram illustrating a method for performing enhanced data analytics using a virtual index server, according to some embodiments.

FIG. 20—Enhanced Data Analytics Using a Virtual Index Server

FIG. 20 is a flowchart diagram illustrating a method for performing enhanced data analytics using a virtual index server, according to some embodiments. While FIG. 20 is described as a method performed by a virtual index server, it is to be understood that the described methods may be performed more generally by any type of computer system connected to an IP network. For example, a computer system with access to a single host/domain may implement the described methods by normalizing, aggregating, and relaying analytics data without necessarily constructing a virtual index using a virtual index server. Some of the method elements shown may be performed concurrently, in a different order than shown, or may be omitted. Additional method elements may also be performed as desired. As shown, the method may operate as follows.

At 2002, a computer system may automatically retrieve a first plurality of log entries regarding access of data of a first website from a content delivery network (CDN). The plurality of log entries may be comprised within one or more log files, or each log entry may comprise a log file. In some embodiments, the computer system may automatically retrieve the first plurality of log entries in a periodic manner. In some embodiments, automatically retrieving the first plurality of log entries may be performed in response to a notification from the CDN.

At 2004, the computer system may determine that a first analytics provider is associated with the first website.

At 2006, the computer system may automatically normalize the first plurality of log entries to be compatible with the first analytics provider to produce a first plurality of normalized log entries.

At 2008, the computer system may automatically provide the first plurality of normalized log entries to the first analytics provider.

In some embodiments, the computer system may repeat steps 2002-2008 for a second plurality of log entries regarding access of data of a second website from the CDN. For example, the computer system may automatically retrieve a second plurality of log entries regarding access of data of a second website from the CDN, and may determine that a second analytics provider is associated with the second website. The computer system may automatically normalize the second plurality of log entries to be compatible with the second analytics provider to produce a second plurality of normalized log entries, wherein said automatically normalizing the second plurality of log entries is performed in a different manner than automatically normalizing the first plurality of log entries. The computer system may then automatically provide the second plurality of normalized log entries to the second analytics provider.

In some embodiments, the computer system may determine that a second analytics provider is associated with the first website, and may automatically normalize the first plurality of log entries to be compatible with the second analytics provider to produce a second plurality of normalized log entries, wherein said automatically normalizing the first plurality of log entries to be compatible with the second analytics provider is different than automatically normalizing the first plurality of log entries to be compatible with the first analytics provider. The computer system may then automatically provide the second plurality of normalized log entries to the second analytics provider.

In some embodiments, the computer system may automatically aggregate at least two of the first plurality of log entries, and said normalizing the first plurality of log entries may comprise normalizing the aggregated at least two log entries.

In some embodiments, the computer system may wait until a threshold number of log entries are retrieved and normalized before providing the normalized log entries are provided to the analytics provider. For example, the computer system may determine a threshold number of log entries associated with the first analytics provider, and may determine that the first plurality of log entries is less than the threshold number of log entries. The computer system may subsequently automatically retrieve a second plurality of log entries regarding access of data of a first website from the CDN, and may determine that the combined first plurality of log entries and second plurality of log entries are greater than the threshold number of log entries or overall log entries. Said automatically normalizing and said automatically providing may then be performed for the combined first plurality of log entries and the second plurality of log entries.

In existing implementations, there may be a disconnect between legacy log mechanisms used by web servers and CDNs. The methods presented herein in reference to FIGS. 19 and 20 of reading and normalizing into a standard log format, from a CDN or otherwise, and then replaying them to an analytics provider, may significantly improve the user experience. Advantageously, an asynchronous process like reading logs is put into a real time system like an analytics provider by forcibly setting the timestamp (date and time) the event occurred, which the analytics provider accepts as authoritative.

Embodiments herein take incompatible formats, normalize the relevant elements, and then transmit them to one or more analytics providers as if they occurred directly on that provider. In current implementations, the analysis process may be bifurcated where content served through a CDN is not analyzed at all or analyzed totally separately from the rest of the analytics data.

For example, a restaurant may have a website that employs a CDN. The restaurant owner may run analytics code on the website, so that anyone who loads the page is reported to the analytics provider. The restaurant may also have a nutritional PDF (or another file or folder) that is managed manage which is served off an asset storage service or the CDN itself (e.g., a storage provider). When a user clicks the nutritional PDF, the analytics provider may record the click, or it may not be able to record the click. A storage provider may then serve the data to the browser. However, because the file is a PDF, and cannot report to the analytics provider, there may be no analytics data. The storage provider may log that it was served, however that data may not be available to the analytics provider. If the URL for the nutrition PDF is shared with another entity, that information may also not be logged by the analytics provider. According to embodiments herein, the restaurant may capture the full set of analytics from the analytics provider, from the web browsing, and from the download of the nutritional PDF by a storage provider. They may also capture any sharing, bookmarking, or linking of the PDF or other future direct accesses. This provides the restaurant a more full and complete picture in a single flexible analytics provider of their choosing.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method, comprising:
by a computer system:
automatically retrieving a first plurality of log entries regarding access of data of a first website from a content delivery network (CDN);
determining that a first analytics provider is associated with the first website;
automatically normalizing the first plurality of log entries to be compatible with the first analytics provider to produce a first plurality of normalized log entries;
automatically providing the first plurality of normalized log entries to the first analytics provider;
determining that a second analytics provider is associated with the first website;
automatically normalizing the first plurality of log entries to be compatible with the second analytics provider to produce a second plurality of normalized log entries, wherein said automatically normalizing the first plurality of log entries to be compatible with the second analytics provider is different than automatically normalizing the first plurality of log entries to be compatible with the first analytics provider; and
automatically providing the second plurality of normalized log entries to the second analytics provider.

2. The method of claim 1, further comprising:
automatically retrieving a third plurality of log entries regarding access of data of a second website from the CDN;
determining that a third analytics provider is associated with the second website;
automatically normalizing the third plurality of log entries to be compatible with the third analytics provider to produce a third plurality of normalized log entries, wherein said automatically normalizing the third plurality of log entries is performed in a different manner than automatically normalizing the first plurality of log entries; and
automatically providing the third plurality of normalized log entries to the third analytics provider.

3. The method of claim 1, wherein said automatically retrieving the first plurality of log entries is performed in a periodic manner.

4. The method of claim 1, wherein said automatically retrieving the first plurality of log entries is performed in response to a notification from the CDN.

5. The method of claim 1, further comprising:
automatically aggregating at least two of the first plurality of log entries, wherein said normalizing the first plurality of log entries comprises normalizing the aggregated at least two log entries.

6. The method of claim 1, further comprising:
determining a threshold number of log entries associated with the first analytics provider;
determining that the first plurality of log entries is less than the threshold number of log entries;
automatically retrieving a plurality of log entries regarding access of data of a first website from the CDN;
determining that the combined first plurality of log entries and plurality of log entries are greater than the threshold number of log entries; and
wherein said automatically normalizing and said automatically providing are performed for the combined first plurality of log entries and the plurality of log entries.

7. A non-transitory computer accessible memory medium storing program instructions executable by one or more processing elements to cause a computer system to:
automatically retrieve a first plurality of log entries regarding access of data of a first website from a content delivery network (CDN);
determine that a first analytics provider is associated with the first website;
automatically normalize the first plurality of log entries to be compatible with the first analytics provider to produce a first plurality of normalized log entries;
automatically provide the first plurality of normalized log entries to the first analytics provider;
determine that a second analytics provider is associated with the first website;
automatically normalize the first plurality of log entries to be compatible with the second analytics provider to produce a second plurality of normalized log entries, wherein said automatically normalizing the first plurality of log entries to be compatible with the second analytics provider is different than automatically normalizing the first plurality of log entries to be compatible with the first analytics provider; and
automatically provide the second plurality of normalized log entries to the second analytics provider.

8. The non-transitory computer accessible memory medium of claim 7, wherein the program instructions are further executable by the one or more processing elements to cause the computer system to:
automatically retrieve a third plurality of log entries regarding access of data of a second website from the CDN;
determine that a third analytics provider is associated with the second website;
automatically normalize the third plurality of log entries to be compatible with the third analytics provider to produce a third plurality of normalized log entries, wherein said automatically normalizing the third plurality of log entries is performed in a different manner than automatically normalizing the first plurality of log entries; and
automatically provide the third plurality of normalized log entries to the third analytics provider.

9. The non-transitory computer accessible memory medium of claim 7, wherein said automatically retrieving the first plurality of log entries is performed in a periodic manner.

10. The non-transitory computer accessible memory medium of claim 7, wherein said automatically retrieving the first plurality of log entries is performed in response to a notification from the CDN.

11. The non-transitory computer accessible memory medium of claim 7, wherein the program instructions are further executable by the one or more processing elements to cause the computer system to:
automatically aggregate at least two of the first plurality of log entries, wherein said normalizing the first plurality of log entries comprises normalizing the aggregated at least two log entries.

12. The non-transitory computer accessible memory medium of claim 7, wherein the program instructions are further executable by the one or more processing elements to cause the computer system to:
determine a threshold number of log entries associated with the first analytics provider;
determine that the first plurality of log entries is less than the threshold number of log entries;
automatically retrieve a second plurality of log entries regarding access of data of a first website from the CDN;
determine that the combined first plurality of log entries and second plurality of log entries are greater than the threshold number of log entries; and
wherein said automatically normalizing and said automatically providing are performed for the combined first plurality of log entries and the plurality of log entries.

13. A computer system, comprising:
one or more memory mediums, storing program instructions;
one or more processing elements coupled to the one or more memory mediums, wherein the one or more processing elements are configured to execute the program instructions to cause the computer system to:
automatically retrieve a first plurality of log entries regarding access of data of a first website from a content delivery network (CDN);
determine that a first analytics provider is associated with the first website;
automatically normalize the first plurality of log entries to be compatible with the first analytics provider to produce a first plurality of normalized log entries;
automatically provide the first plurality of normalized log entries to the first analytics provider;
determine that a second analytics provider is associated with the first website;
automatically normalize the first plurality of log entries to be compatible with the second analytics provider to produce a second plurality of normalized log entries, wherein said automatically normalizing the first plurality of log entries to be compatible with the second analytics provider is different than automatically normalizing the first plurality of log entries to be compatible with the first analytics provider; and
automatically provide the second plurality of normalized log entries to the second analytics provider.

14. The computer system of claim 13, wherein the program instructions are further executable by the one or more processing elements to cause the computer system to:
automatically retrieve a third plurality of log entries regarding access of data of a second website from the CDN;
determine that a third analytics provider is associated with the second website;
automatically normalize the third plurality of log entries to be compatible with the third analytics provider to produce a third plurality of normalized log entries, wherein said automatically normalizing the third plurality of log entries is performed in a different manner than automatically normalizing the first plurality of log entries; and automatically provide the third plurality of normalized log entries to the third analytics provider.

15. The computer system of claim 13, wherein said automatically retrieving the first plurality of log entries is performed in response to a notification from the CDN.

16. The computer system of claim 13, wherein the program instructions are further executable by the one or more processing elements to cause the computer system to:

automatically aggregate at least two of the first plurality of log entries, wherein said normalizing the first plurality of log entries comprises normalizing the aggregated at least two log entries.

17. The computer system of claim 13, wherein the program instructions are further executable by the one or more processing elements to cause the computer system to:

determine a threshold number of log entries associated with the first analytics provider;

determine that the first plurality of log entries is less than the threshold number of log entries;

automatically retrieve a second plurality of log entries regarding access of data of a first website from the CDN;

determine that the combined first plurality of log entries and second plurality of log entries are greater than the threshold number of log entries; and wherein said automatically normalizing and said automatically providing are performed for the combined first plurality of log entries and the second plurality of log entries.

* * * * *

UNITED STATES PATENT AND TRADEMARK OFFICE
CERTIFICATE OF CORRECTION

PATENT NO. : 10,896,240 B2  
APPLICATION NO. : 15/925659  
DATED : January 19, 2021  
INVENTOR(S) : Derek B. Labian Page 1 of 1

It is certified that error appears in the above-identified patent and that said Letters Patent is hereby corrected as shown below:

In the Claims

Claim 6, Column 45, Line 6, please delete "automatically retrieving a plurality of log entries regard-" and substitute -- automatically retrieving a second plurality of log entries regard- --.

Claim 6, Column 45, Line 9, please delete "and plurality of log entries are greater than the thresh-" and substitute -- and second plurality of log entries are greater than the thresh- --.

Claim 6, Column 45, Line 13, please delete "first plurality of log entries and the plurality of log" and substitute -- first plurality of log entries and the second plurality of log --.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*